United States Patent
Yim

(10) Patent No.: US 10,339,641 B2
(45) Date of Patent: Jul. 2, 2019

(54) IMAGE PROCESSING APPARATUS AND METHOD, AND DECODING APPARATUS

(71) Applicant: SAMSUNG ELECTRONICS CO., LTD., Suwon-si (KR)

(72) Inventor: Dale Yim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 177 days.

(21) Appl. No.: 15/207,674

(22) Filed: Jul. 12, 2016

(65) Prior Publication Data

US 2017/0069063 A1  Mar. 9, 2017

(30) Foreign Application Priority Data

Sep. 9, 2015 (KR) .......... 10-2015-0127631

(51) Int. Cl.
*G06K 9/40* (2006.01)
*G06T 5/20* (2006.01)
*G06T 5/00* (2006.01)

(52) U.S. Cl.
CPC ............ *G06T 5/20* (2013.01); *G06T 5/002* (2013.01)

(58) Field of Classification Search
CPC .................................. G06T 5/20; G06T 5/002
See application file for complete search history.

(56) References Cited

U.S. PATENT DOCUMENTS

| | | | | |
|---|---|---|---|---|
| 6,055,340 | A * | 4/2000 | Nagao ............ | G06T 5/004 382/261 |
| 8,300,135 | B2 * | 10/2012 | Koh ............ | H04N 5/23212 348/335 |
| 8,699,813 | B2 * | 4/2014 | Singh ............ | H04N 5/213 382/256 |
| 2007/0252899 | A1 * | 11/2007 | Shimizu ............ | G06T 5/20 348/222.1 |
| 2008/0159727 | A1 * | 7/2008 | Hamamura ............ | G02B 7/102 396/104 |
| 2010/0315514 | A1 * | 12/2010 | Uchida ............ | H04N 5/23212 348/187 |
| 2011/0026606 | A1 * | 2/2011 | Bhagavathy ............ | G06T 5/002 375/240.26 |
| 2012/0182388 | A1 * | 7/2012 | Lim, II ............ | H04N 19/597 348/43 |
| 2013/0278829 | A1 * | 10/2013 | Tegzes ............ | H04N 5/21 348/607 |
| 2015/0109515 | A1 * | 4/2015 | Kobuse ............ | H04N 5/23212 348/349 |

OTHER PUBLICATIONS

Tzu-Chao Lin, A new adaptive center weighted median filter for supressing implusive noise in images, SienceDirect Information Sciencesw 177 (2007), pp. 1073-1087.*
Hardie etal., LUM Filters: A Class of Rank-Order-Based Filters for Smoothing and Sharpening, IEEE 1993, pp. 1061-1076.*

\* cited by examiner

*Primary Examiner* — Samir A Ahmed
(74) *Attorney, Agent, or Firm* — Sughrue Mion, PLLC

(57) ABSTRACT

The present disclosure relates to an image processing apparatus and method and decoding apparatus. The image processing apparatus may comprises a receiver for receiving an image and an image processor for dividing the image into a plurality of regions, and performing filtering by iteratively applying at least one filter to each of the plurality of regions in the image, wherein the at least one filter comprises an asymmetric filter that uses an asymmetric filtering window having height and width in different size.

18 Claims, 33 Drawing Sheets

FIG. 26

| e1 | e2 | e3 | e4 | e5 | e6 | e7 | e8 | e9 | e10 | e11 |
|---|---|---|---|---|---|---|---|---|---|---|
| 0_aaaa | 0_bbbb | 0_cccc | 0_dddd | 0_eee | 0_fff | 0_gg | 0_hh | 0_i | 0_j | 10 |
| | | | | | | | | | | |
| | | | | | | | | | | |

IMAGE PROCESSING APPARATUS AND METHOD, AND DECODING APPARATUS

CROSS-REFERENCE TO RELATED APPLICATION

This application claims priority from Korean Patent Application No. 10-2015-0127631, filed on Sep. 9, 2015, the disclosure of which is incorporated herein by reference in its entirety.

BACKGROUND

1. Field

Methods and apparatuses consistent with exemplary embodiments relate to an image processing apparatus and method, and decoding apparatus.

2. Discussion of Related Art

An image processing apparatus refers to a device that is able to perform image processing on all or part of image data of an image. Image processing may include performing expansion, reduction, rotation, or color correction of an image, matching a plurality of image data, adjusting video level or chroma level, or acquiring new image data by processing image data, such as dividing some of the image data.

Display devices are types of output devices for displaying obtained or stored electrical information by converting the electrical information to visual information, and are used in various home or business applications. The display device may perform certain image processing on a received, input, or stored image, and display the resultant image for the user, in which respect it may also be considered as a type of image processing apparatus. There may be various kinds of display devices or other various audio/video systems used to reproduce images such as advertisements or films, such as monitor devices connected to personal computers (PCs) or server computers, portable computer systems, Global Positioning System (GPS) terminals, general television sets, Internet protocol television (IPTV), portable terminals, e.g., smart phones, tablet PCs, personal digital assistants (PDAs), and cellular phones, billboards, etc.

SUMMARY

At least one exemplary embodiment provides an image processing apparatus and method and decoding apparatus, capable of performing image processing on image data by reflecting intention of a producer, e.g., a photographer who produces image data.

Further, at least one exemplary embodiment also provides an image processing apparatus and method and decoding apparatus, capable of performing window-based image processing more quickly, while requiring relatively less computing resources, such as line memories.

Further still, at least one exemplary embodiment also provides an image processing apparatus and method and decoding apparatus, capable of acquiring a proper image quality processing model and quickly and accurately restoring high-resolution images with relatively less resources, in inverse-transform image processing to restore a high-resolution image from a low-resolution image.

To achieve the aforementioned objects, an image processing apparatus and method, and decoding apparatus are provided.

According to an aspect of an exemplary embodiment, there is provided an image processing apparatus including: a receiver configured to receive an image; and an image processor configured to divide the image into a plurality of regions, and to generate an enhanced image by iteratively applying at least one filter to each of the plurality of regions in the image, the at least one filter including an asymmetric filter that uses an asymmetric filtering window having a first height and a first width different from the first height.

The at least one filter may include at least one among a high frequency filter, an intermediate frequency filter, and a low frequency filter.

The image processor may be further configured to determine a plurality of focus levels, each of the plurality of focus levels respectively corresponding to one of the plurality of regions in the image.

The plurality of regions may include a center region and a surrounding region.

The image processor may be further configured to determine a focused state of the image based on a center region focus level corresponding to the center region and a surrounding region focus level corresponding to the surrounding region.

The image processor may be further configured to apply one among a high frequency filter and an intermediate frequency filter to the center region, and a low frequency filter to the surrounding region, based on the image being in an out-of-focus state.

The image processor may be further configured to apply a same filter to the center region and the surrounding region, based on the image being in a pan-focused state.

The image processor may be further configured to determine a plurality of respective weights, each of the plurality of respective weights respectively corresponding to one of the plurality of regions, issue the plurality of respective weights to the at least one filter, and apply the at least one filter, to which the weights are issued, to each of the plurality of regions in the image.

The at least one filter may further include a symmetric filter that uses a symmetric filtering window having a second height and a second width equal to the second height.

The image processor include a first filter applier configured to sequentially perform filtering and a second filter applier configured to sequentially perform filtering.

The first filter applier configured to sequentially perform filtering and the second filter applier may be configured to perform filtering with at least one asymmetric filter and a symmetric filter.

The image processor may be further configured to perform filtering by applying the asymmetric filter to $k^{th}$ to $n^{th}$ rows in the image, and perform filtering again by applying the asymmetric filter to $k+1^{th}$ to $n+1^{th}$ rows in the image, where k and n are natural numbers and k is smaller than n.

The image processor may be further configured to filter a first pixel located in a region of the plurality of regions in the image, to which the asymmetric filtering window is applied.

The image processor may be further configured to filter the first pixel by using data of at least one pixel located in the region and located adjacent to the first pixel.

The image processor may be further configured to filter the first pixel by using data of at least one pixel located in the region and located adjacent to the first pixel, and data of at least one pixel located outside the region and located adjacent to the first pixel.

The data of at least one pixel located outside the region and located adjacent to the first pixel may include actual data of the at least one pixel located outside the region and located adjacent to the first pixel.

The first width may be greater than the first height.

According to an aspect of another exemplary embodiment, there is provided an image processing method including: receiving an image; and generating an enhanced image by iteratively applying at least one filter to the image, the at least one filter including an asymmetric filter that uses an asymmetric filtering window having a first height and a first width different from the first height.

According to an aspect of yet another exemplary embodiment, there is provided an image processing method including: receiving an image; and generating an enhanced image by iteratively applying at least one filter to a first pixel located in a region in the image, the at least one filter using an asymmetric filtering window.

BRIEF DESCRIPTION OF THE DRAWINGS

The above and other aspects, features and advantages will become more apparent to those of ordinary skill in the art by describing in detail exemplary embodiments with reference to the accompanying drawings, in which:

FIGS. 21 to 26 show pixel values obtained by repeatedly using pixel values of pixels outside and adjacent to edges of a filtering window, according to one or more exemplary embodiments;

FIGS. 27 to 29 show pixel values of pixels obtained by using actual values outside the edges of a filtering window, according to one or more exemplary embodiments;

DETAILED DESCRIPTION

Exemplary embodiments of an image processing apparatus and a display device including the image processing apparatus will now be described with reference to FIGS. 1 to 33.

Figure 1:
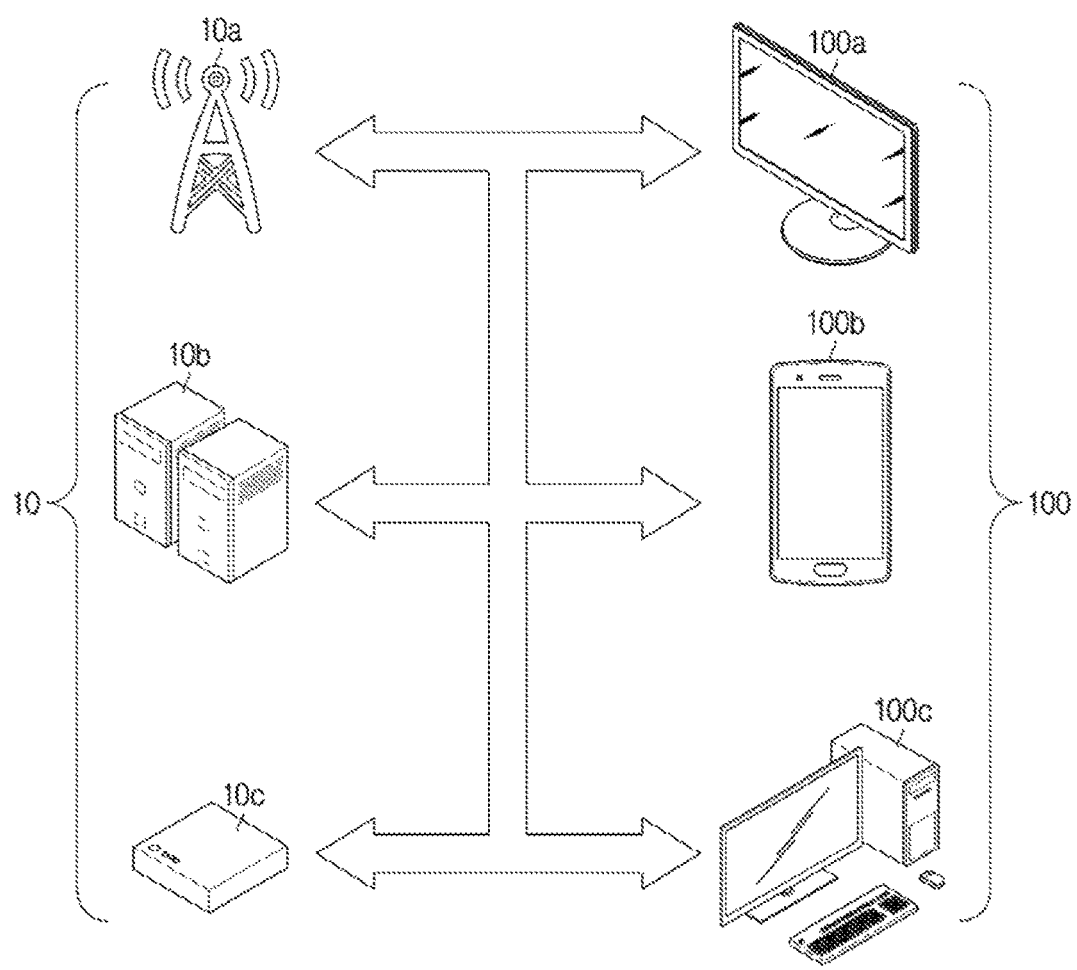
FIG. 1 shows a structure of image delivery to display devices according to an exemplary embodiment.

FIG. 1 shows a structure of delivering an image to an image processing apparatus, e.g., a display device.

An image processing apparatus 100 refers to a device for correcting a received image by performing certain processing on the received image. The image processing apparatus 100 may be equipped with an output means for providing images to the user, e.g., a viewer as needed, and a processor for performing various computation, such as a central processing unit (CPU) or a micro control unit (MCU). Referring to FIG. 1, the image processing apparatus 100 may include, for example, a display device 100*a* like a television, a portable terminal 100*b*, or a computer 100*c* such as a personal computer (PC) or a server computer.

The display device 100*a* may reproduce and display an image for the user, and may further output sounds for the user as needed. The image displayed by the display device 100*a* may include still images and moving images, and each moving image may be comprised of a plurality of image frames, each image frame being implemented using still images.

The display device 100*a* may use various kinds of display technologies to display still images or moving images for the user. For example, the display device 100*a* may be implemented using a Cathode Ray Tube (CRT), a Cold Cathode Fluorescent Lamp (CCFL), Light Emitting diodes (LEDs), Organic LEDs (OLEDs), Active-Matrix OLEDs (AMO-LEDs), liquid crystal, electronic paper, or the like.

The display device 100*a* may display a still image or moving image stored in a storage device built into the display device 100*a*, or may display an image provided by an external image provider 10, as shown in FIG. 1.

The portable terminal 100*b* may include a smart phone, a tablet PC, a personal digital assistant (PDA), a portable multimedia player (PMP), a portable game device, a terminal for digital broadcasting, or the like. The computer 100*c* may be equipped with a processor capable of performing various computation and a monitor device for displaying images, and may include e.g., a desktop computer or a laptop computer. In addition to what is shown in FIG. 1, the display device 100*a* may include other various display devices capable of displaying still or moving images at home or for industrial applications.

The image provider 10 refers to an entity that sends and provides the stored or created images and/or sounds in a data format, and may include e.g., a transmitting apparatus 10*a* for broadcasting, a separate server 10b, or an external storage medium 10c that may be separated from the display device 100a.

The transmitting apparatus 10a for broadcasting is configured to transmit image data and/or sound data on carrier waves of certain frequencies for air communication to the display device 100a. The transmitting apparatus 10a may transmit image and/or sound data to the display device 100a or an antenna device coupled with the display device 100a, via e.g., satellites.

The server 10b is configured to send image data and/or sound data to the display device 100a over wireless or wired network. The wired network may be built with e.g., a pair cable, a coaxial cable, a fiber-optic cable, an Ethernet cable, etc. The wireless network may be implemented using a short-range communication standard or a mobile communication standard. The wireless network using the short-range communication standard may be implemented using Wi-Fi, Bluetooth, Zigbee, Wi-Fi Direct (WFD), Ultra Wideband (UWB), Infrared Data Association (IrDA), Bluetooth Low Energy (BLE), Near Field Communication (NFC), etc., without being limited thereto. The wireless network using the mobile communication standard may be implemented using a 3GPP-based wireless communication technology, such as Highest Probability Data Association (HPDA+) or Long-Term Evolution (LTE), 3GPP2-based wireless communication technology such as optimal Evolution Data (EV-Do), or WIMAX-based wireless communication technology such as Wibro Evolution.

The external storage medium 10c refers to a device capable of storing various data, such as an external hard disk, a Universal Serial Bus (USB) memory device, etc. The external storage medium 10c is directly combined with th display device 100a to provide images to the display device 100a, or provide image data to the display device 100a via a cable or a wireless network.

In the following, for convenience of explanation, exemplary embodiments of the image processing apparatus 100 will be described by focusing on the display device 100a for receiving image data and/or sound data from the transmitting apparatus 10a and displaying the image data and/or sound data. However, the exemplary embodiments are not only limited to the display device 100a. Exemplary embodiments will be described below will also be applied to other image processing apparatuses 100b, 100c equally or with partial modification.

First, an example of the transmitting apparatus 10 for providing images to the display device 100a, which is an example of the image processing apparatus 100, will now be described.

Figure 2:
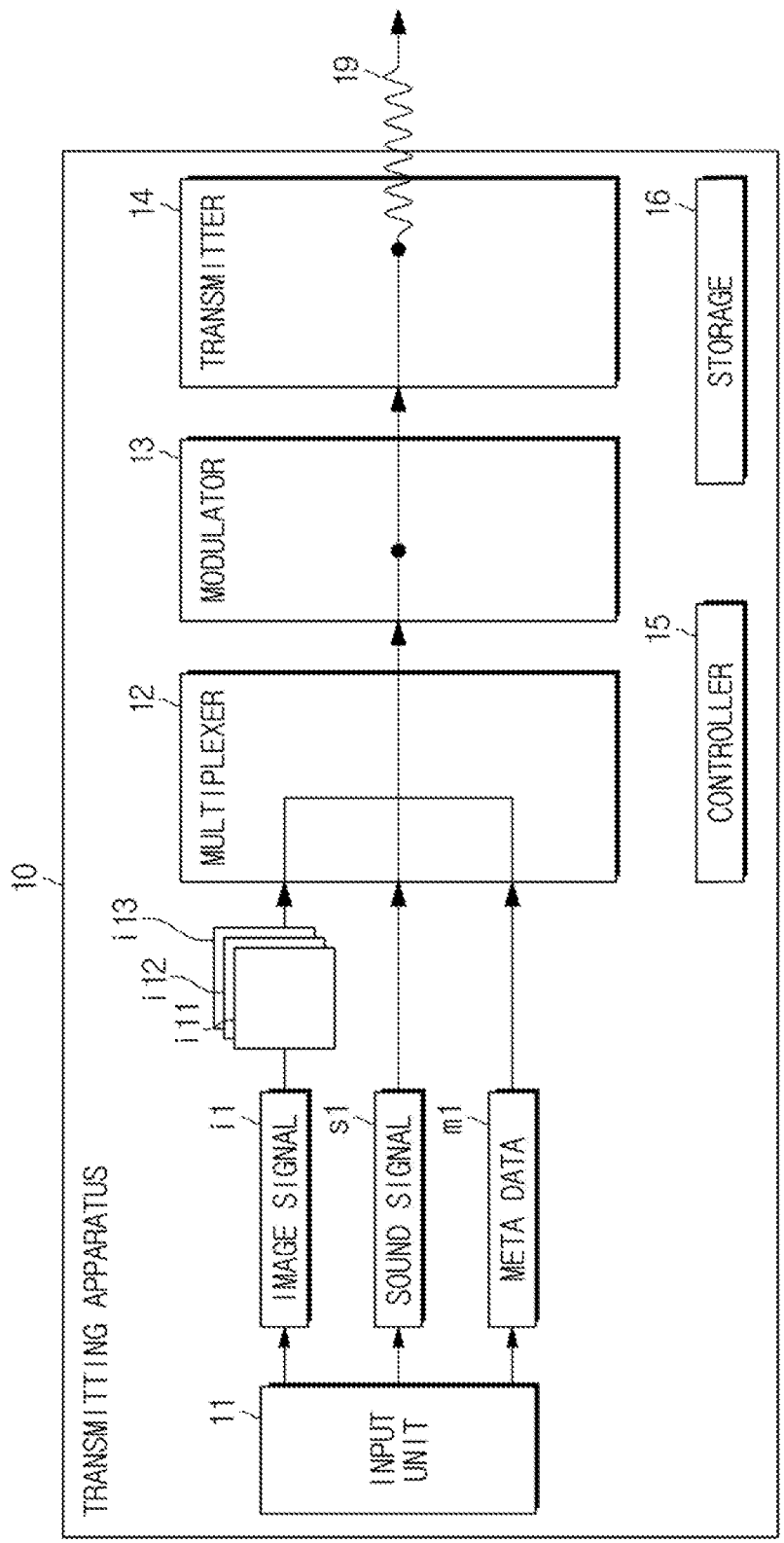
FIG. 2 is a block diagram of a transmitting apparatus, according to an exemplary embodiment.

FIG. 2 is a block diagram of a transmitting apparatus, according to an exemplary embodiment of the present disclosure.

Referring to FIG. 2, the transmitting apparatus 10 may include an input unit 11, a multiplexer 12, a modulator 13, a transmitter 14, a controller 15, and a storage 16.

The input unit 11 may receive image data i1 embodied in an electric signal having information of an image, sound data s1, which is an electric signal having information of music, voice, and/or other sound, and meta data m1, which is an electric signal having information relating to the image and the sound.

The image data i1 refers to data corresponding to at least one image. If the image is a moving image, the image data i1 may include data about a plurality of still images i11 to i13 corresponding to the respective image frames to form the moving image.

The sound data s1 refers to data obtained from conversion of voice, music, or other sound. In the case that the image is a moving image, the sound data s1 may be configured to be in sync with the image data i1.

The meta data m1 may include information regarding at least one of an image and a sound input through the input unit 11. For example, the meta data m1 may include at least one of various information, such as title or genre of the image or sound input through the input unit 11, tag information attached to the image or sound, file name of the image or sound, file size, date and time when the image is captured, date and time when the image or sound is modified, width and height of the image, time length of the image (moving image) or sound, manufacturer of the imaging or recording medium, model name of the imaging or recording medium, type of software used in image capturing, shutter speed, aperture value, focal distance, sensitivity of the camera, size of a target, information regarding exposure or photometry, image or sound compression scheme, information about whether to use an additional device, owner of copyright, information about whether the image is stereoscopic, etc. Depending on the designer's selection, some of the aforementioned information may not be included in the meta data m1, or other information may be included in the meta data m1. The imaging medium refers herein to various devices that are able to capture images, such as a digital camera, a film camera, a digital camcorder, a video tape recorder (VTR), or the like.

Figure 3:
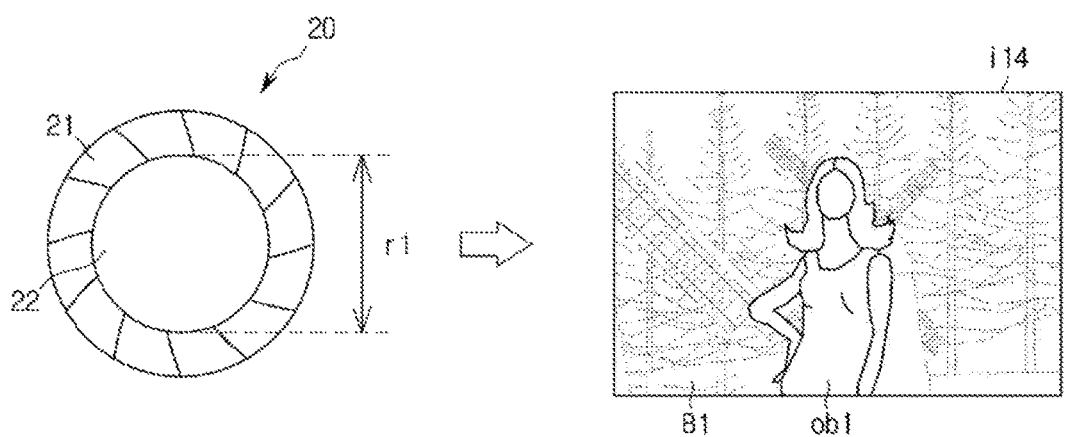
FIG. 3 shows an image out of focus, which is obtained with a small aperture value, according to an exemplary embodiment.
Figure 4:
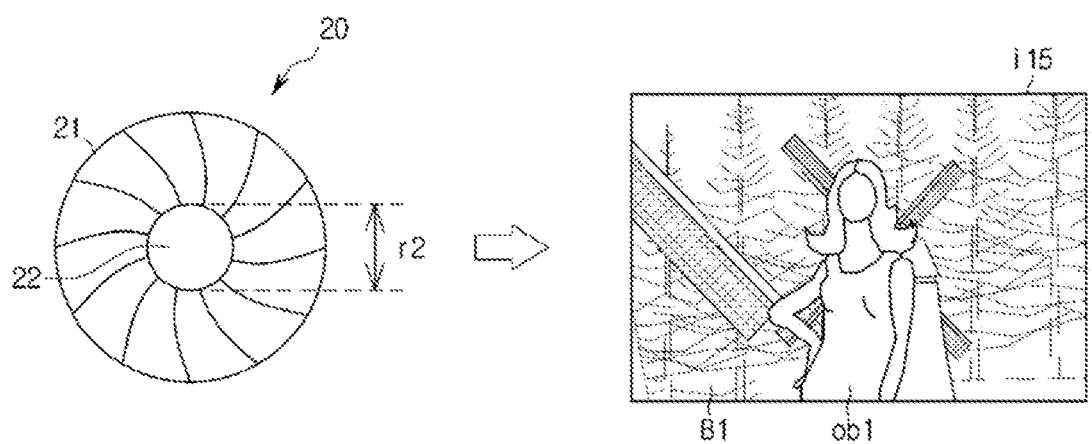
FIG. 4 shows a pan focused image obtained with a large aperture value, according to an exemplary embodiment.

FIG. 3 shows an image out of focus, which is obtained with a small aperture value, and FIG. 4 shows a pan-focused image obtained with a large aperture value.

Specifically, the meta data m1 about an image may include information obtained at a moment when each image i11, i12, or i13 is captured. The image i11, i12, or i13 may be a still image, or an image frame of a moving image.

The information about a moment when each image i11, i12, or i13 is captured may include information relating to depth of field of the image i11, i12, or i13. For example, the information about a moment when each image i11, i12, or i13 is captured may include information about at least one of a focal distance and an aperture value (f value) at the moment when the image was captured. In some exemplary embodiments, the information about a moment when each image i11, i12, or i13 is captured may further include information about a size of a target, or a distance between the imaging medium 20 and the object ob1.

The depth of field means a focus range or effective focus range in a captured image. A long depth of field means that various objects at different distances to the imaging medium 20 are in focus, and a short depth of field means that an object at a particular distance to the imaging medium 20 is in focus while the other objects in a different range are out of focus.

The depth of field of the captured image i14 or i15 may be determined based on a focal distance set in the imaging medium 20, e.g., a camera, an aperture value (f value), and a distance between two objects, e.g., between the object and the background.

The focal distance refers to a distance between the center of a lens of the imaging medium 20, e.g., a camera, and a focal point. The longer the focal distance, the shorter the depth of field, and the shorter the focal distance, the longer the depth of field.

The aperture value indicates an extent to which an aperture 21 of the camera 20 is opened, and obtained by dividing the focal distance of the lens by the diameter r1 or r2 of an entrance pupil 22. The aperture value decreases as the aperture 21 is opened wider, and increases as the aperture 21 is narrowed. The smaller the aperture value, the shorter the depth of field, and the larger the aperture value the longer the depth of field.

In the meantime, if a distance between the object and the imaging medium is short, and a difference between the distance between the object and the imaging medium and a distance between another object and the imaging medium is big, it is unlikely that both of the objects are in the area in focus, and thus the depth of field in the captured image i14 or i15 is more likely to be short. Otherwise, if a distance between the object and the imaging medium is long, and a difference between the distance between the object and the imaging medium and a distance between another object and the imaging medium is small, it is likely that both of the objects are in an area in focus, and thus the depth of field in the captured image i14 or i15 is more likely to be long.

Referring to FIGS. 3 and 4, in a case that the imaging medium is taking a picture of an object, which is located a bit closer to the imaging medium, the aperture value and focal distance of the imaging medium may be controlled manually by the user or may be controlled by predetermined settings.

If the focal distance of the imaging medium 20 is set to be long, or the aperture 21 of the imaging medium 20 is widened and thus the diameter r1 of the entrance pupil 22 is relatively increased as shown in FIG. 3, the depth of field of the acquired image i14 appears short (out of focus). In other words, in the acquired image i14, object ob1 at a particular distance appears in focus while background B1 appears out of focus.

On the contrary, if the focal distance of the imaging medium 20 is set to be short, or the aperture 21 of the imaging medium 20 is narrowed and thus the diameter r2 of the entrance pupil 22 is relatively decreased as shown in FIG. 4, the depth of field of the acquired image i15 appears long (pan focus). In other words, in the acquired image i15, both the particular object ob1 and the background B1 appear in focus.

In the meantime, if the focal distance of the imaging medium 20 is set to be long and the entrance pupil 22 is widely opened as shown in FIG. 3, an image may be acquired in which a nearby object is not in focus while the background is in focus (inverse out-of-focus).

The meta data m1 may include, as described above, information about a focal distance and/or aperture value for the image i1 or i2, and the information may be sent with image data i1 to the display device 100a through the multiplexer 12, modulator 13, and transmitter 14.

The multiplexer 12 may generate a transport stream (ts) by multiplexing at least one of the image data i1, the sound data s1, and the meta data m1. In some exemplary embodiments, the multiplexer 12 may leave out the meta data m1 as needed, and multiplex only the image data i1 and the sound data s1. Specifically, the multiplexer 12 may perform multiplexing by combining elementary streams comprised of at least one of the image data i1, the sound data s1, and the meta data m1 in packets.

A modulator 13 may modulate the transport stream generated by the multiplexer 12 for transmission and send the modulated transport stream to the transmitter 14. The modulator 13 may modulate the transport stream in a predetermined modulation scheme. For example, it may modulate the transport stream in various schemes, such as a scheme to modulate at least one of the frequency, amplitude and phase of the transport stream, or a scheme to convert the transport stream into pulses.

The transmitter 14 may send out the modulated transport stream, which is then delivered to a receiver 110 of the display device 100a. The transmitter 14 may send out the transport stream in the form of electric waves 19, and a wireless communication module 111 of the display device 100a may obtain at least one of the image data i1, sound data s1, and meta data m1 by receiving the electric waves 19.

The controller 15 is configured to control overall operation of the transmitting apparatus 10. For example, the controller 15 may send control signals to the multiplexer 12, modulator 13, and transmitter 14 to control their respective operation such that at least one of the image data i1, sound data s1, and meta data m1 may be delivered to the display device 100a. The controller 15 may include a processor implemented with one or more semiconductor chips and associated components.

The storage 16 is configured to store various instructions and information required for operation of the transmitting apparatus 10 and to support the control operation of the controller 15. The storage 16 may be implemented using a semiconductor storage device, a magnetic disk storage device, or an optical disk storage device. The storage 16 may include various types of random access memories (RAMs) or read only memories (ROMs). The storage 16 may temporarily or permanently store the image data i1, sound data s1 and/or meta data m1 input through the input unit 11.

Figure 5:
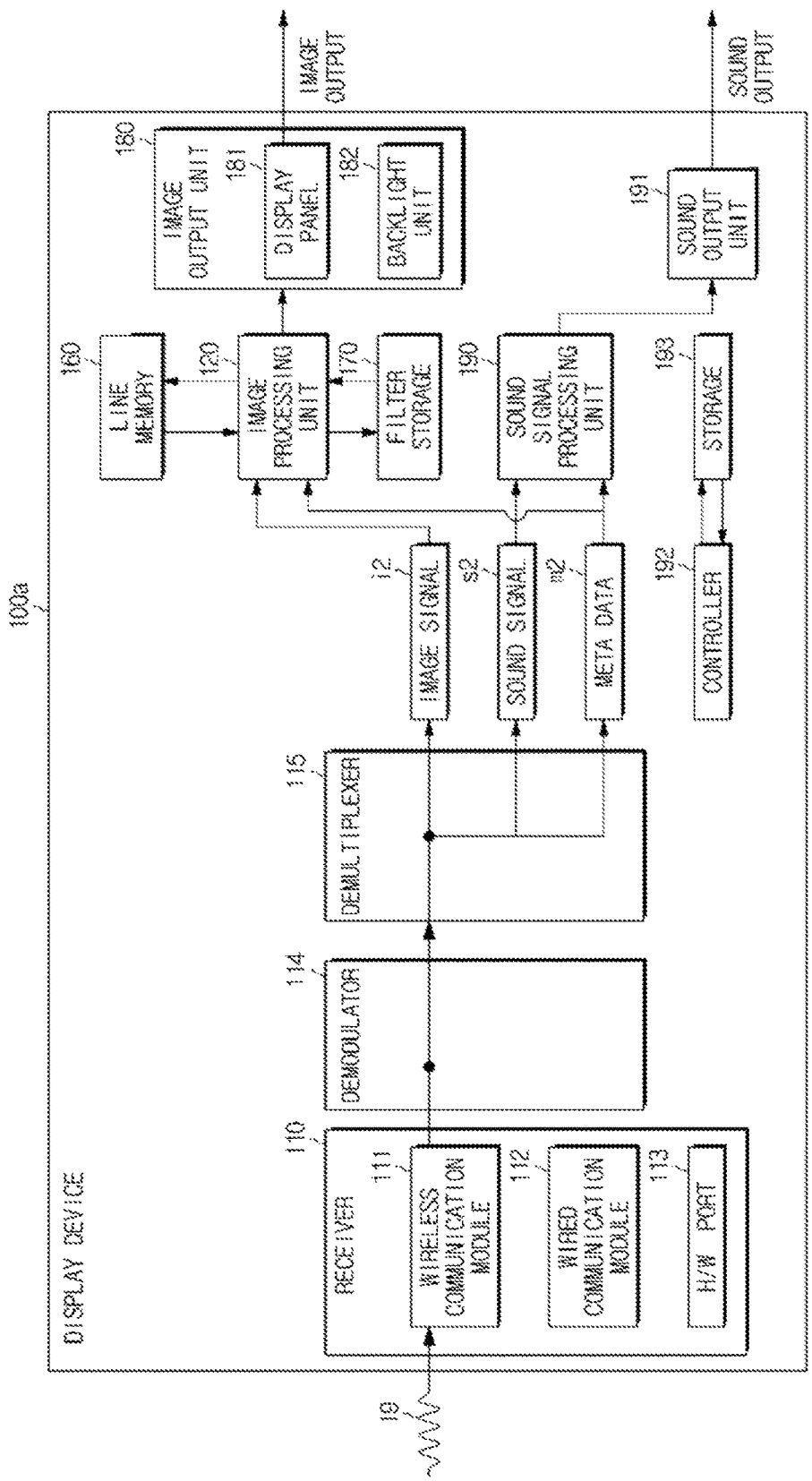
FIG. 5 is a block diagram of a display device, according to an exemplary embodiment.

FIG. 5 is a block diagram of a display device, according to an exemplary embodiment of the present disclosure.

Referring to FIG. 5, the display device 100a may include a receiver 110, a demodulator 114, a demultiplexer 115, an image processor 120, a line memory 160, an image output unit 180, a sound data processing unit 190, a sound output unit 191, a controller 192, and a storage 193. At least two of the receiver 110, demodulator 114, demultiplexer 115, image processor 120, line memory 160, image output unit 180, sound data processing unit 190, sound output unit 191, controller 192, and storage 193 may be configured to be electrically connected by circuits or conductor lines to exchange electric signals. In some exemplary embodiments, the demodulator 114, demultiplexer 115, image processor 120, sound data processing unit 190 and controller 192 may be implemented in two or more hardware devices, the hardware device including a processor that may be implemented with at least one semiconductor chip and associated components. In this case, the respective hardware devices may be the same type or different types of devices. Furthermore, some of the demodulator 114, demultiplexer 115, image processor 120, sound data processing unit 190, and controller 192 may be implemented in a hardware device, and others may be implemented in another hardware device.

The receiver 110 may receive a transport stream delivered from the image provider 10. In an exemplary embodiment, the receiver 110 may include at least one of a wireless communication module 111, a wired communication module 112, and a hardware port 113.

The wireless communication module 111 may receive an electric signal over a wireless communication network, and forward the received electric signal to the modulator 114. The wireless communication module 111 may receive the transport stream in the electric waves 19. The wireless communication module 111 may perform wireless communication with an external device based on a short range communication standard or a mobile communication standard. The wireless communication module 111 may be implemented with an antenna and at least one communication chip.

The wired communication module 112 may receive a transport stream over a cable, and send an electric signal corresponding to the received transport stream to the modulator 114. The wired communication module 112 may include a connector combined with e.g., a coaxial cable, an Ethernet cable, a digital visual interface (DVI) cable, or a high definition multimedia interface (HDMI) cable, and the connector may have the form of a plug or socket. The wired communication module 112 may be implemented using a set top box.

The hardware port 113 is mounted on the outer face of the display device 100*a* to be combined with an external storage medium 10*c* directly or via a cable. The hardware port 113 may include e.g., a USB port.

A signal received by the receiver 110 may be forwarded to the demodulator 114.

The demodulator 114 may obtain an original signal, i.e., a transport stream before it was modulated by the modulator 13, by demodulating the signal. The demodulator 114 may be configured to correspond to the modulator 13. The demodulator 114 may send the transport stream to the demultiplexer 115 directly or via one or more other components.

The demultiplexer 115 may demultiplex and extract at least one of image data i2, sound data s2, and meta data m2 from the demodulated transport stream, may send the extracted image data i2 to the image processor 120, and may send the sound data s2 to the sound data processing unit 190. Furthermore, in the case that the meta data m2 is extracted, the demultiplexer 115 may further send the meta data m2 to at least one of the image processor 120 and the sound data processing unit 190. There may be other various components, such as an amplifier or analog/digital converter arranged between the demultiplexer 115 and the image processor 120, in which case the at least one of the image data i2, sound data s2, and meta data m2 may be amplified or converted, and may then be delivered to the image processor 120 or the sound data processing unit 190.

The image processor 120 may perform image processing on the image data i2. The image processor 120 may perform image processing on still images or moving images. In the case of performing image processing on a moving image, the image processor 120 may perform image processing on the moving image by performing image processing on every image frame of the moving image.

In an exemplary embodiment, the image processor 120 may perform image processing with or without the meta data m2.

In an exemplary embodiment, the image processor 120 may use the input image data i2 to determine a focus level for the entire or part of the image, and may use the determined focus level to perform image processing. The focus level is an index that discretely represents an extent to which a particular region in an image is focused. The focus level may be divided into multiple steps, for example, a total of 256 steps, particularly from zero$^{th}$ to 255$^{th}$ steps. In this case, the zero$^{th}$ step is defined as a worst focused state, and the 255$^{th}$ step as a best focused state. Naturally, the number of steps of the focus level or an extent of being focused in each step may be arbitrarily defined by the designer's selection.

Furthermore, in an exemplary embodiment, the image processor 120 may perform inverse-transform image processing through inverse-transform filtering. Inverse-transform image processing refers to a method for restoring a high-definition and high-resolution image from a low-resolution image. Specifically, if an original image has a high resolution while an input image has a low resolution, the inverse-transform image processing refers to a method for restoring its original resolution through the inverse-transform filtering. The image processor 120 may perform the inverse-transform image processing by using at least one of the focal distance and the aperture value included in the meta data m2, or by using a focused state of the image. In this case, the image processor 120 may perform image processing in an iterative way.

Detailed operation of the image processor 120 will be described later.

The line memory 160 may be configured to temporarily or permanently store various data, such as image data. The line memory 160 may be implemented using a semiconductor storage device, a magnetic disk storage device, or an optical disk storage device. The semiconductor storage device may be implemented using a RAM, e.g., at least one of a Static RAM (SRAM), a dynamic RAM (DRAM), a thyristor RAM (T-RAM), and Z-RAM™ (or Zero-capacitor). If a DRAM is used, the line memory 160 may be implemented using a Double-Data-Rate Synchronous DRAM (DDR SDRAM).

The line memory 160 may be electrically connected to the image processor 120 for serving to support the image processor 120 in image processing. For example, the line memory 160 may receive and store a filtered image from the image processor 120, and send the stored filtered image back to the image processor 120 at the call of the image processor 120.

Figure 8:
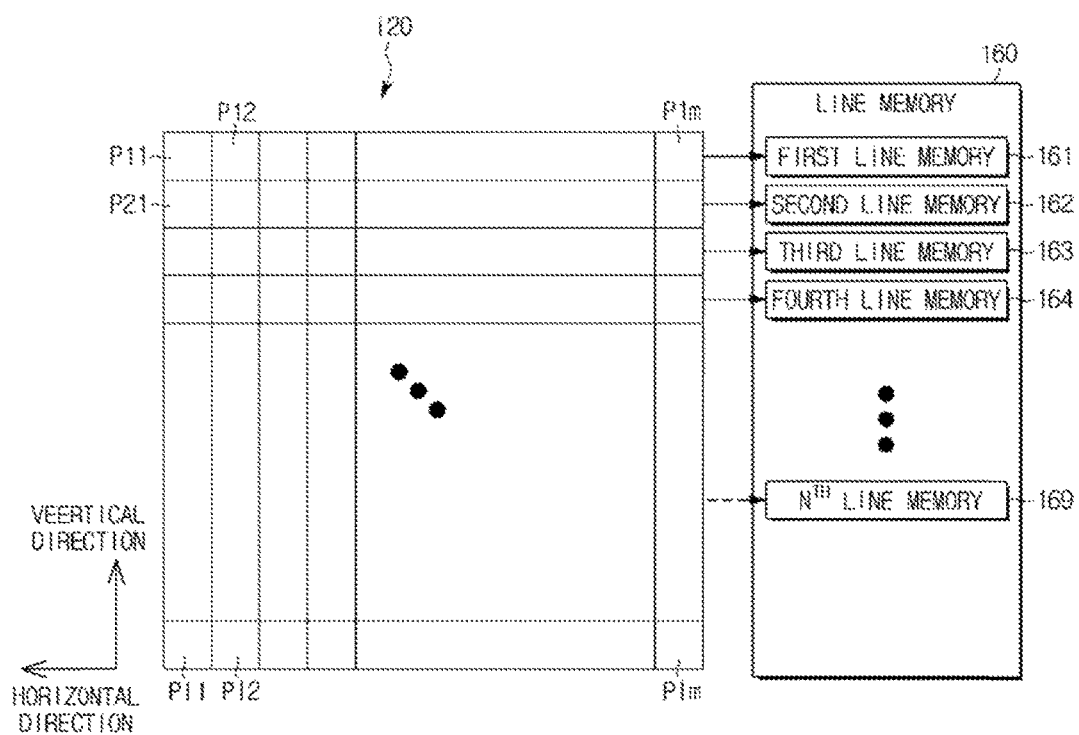
FIG. 8 is a diagram for explaining a line memory, according to an exemplary embodiment.

The line memory 160 may be multiple in number 160 to 169 of FIG. 8, and the image processor 120 may use the multiple line memories 161 to 169 to process a single image. In this case, the line memories 161 to 169 may each be configured to store data for a region in the image. For example, the line memories 161 to 169 may each be configured to store data values of pixels arranged in a same column. In another example, the line memories 161 to 169 may each be configured to store data values of pixels arranged in a same row.

Figure 7:
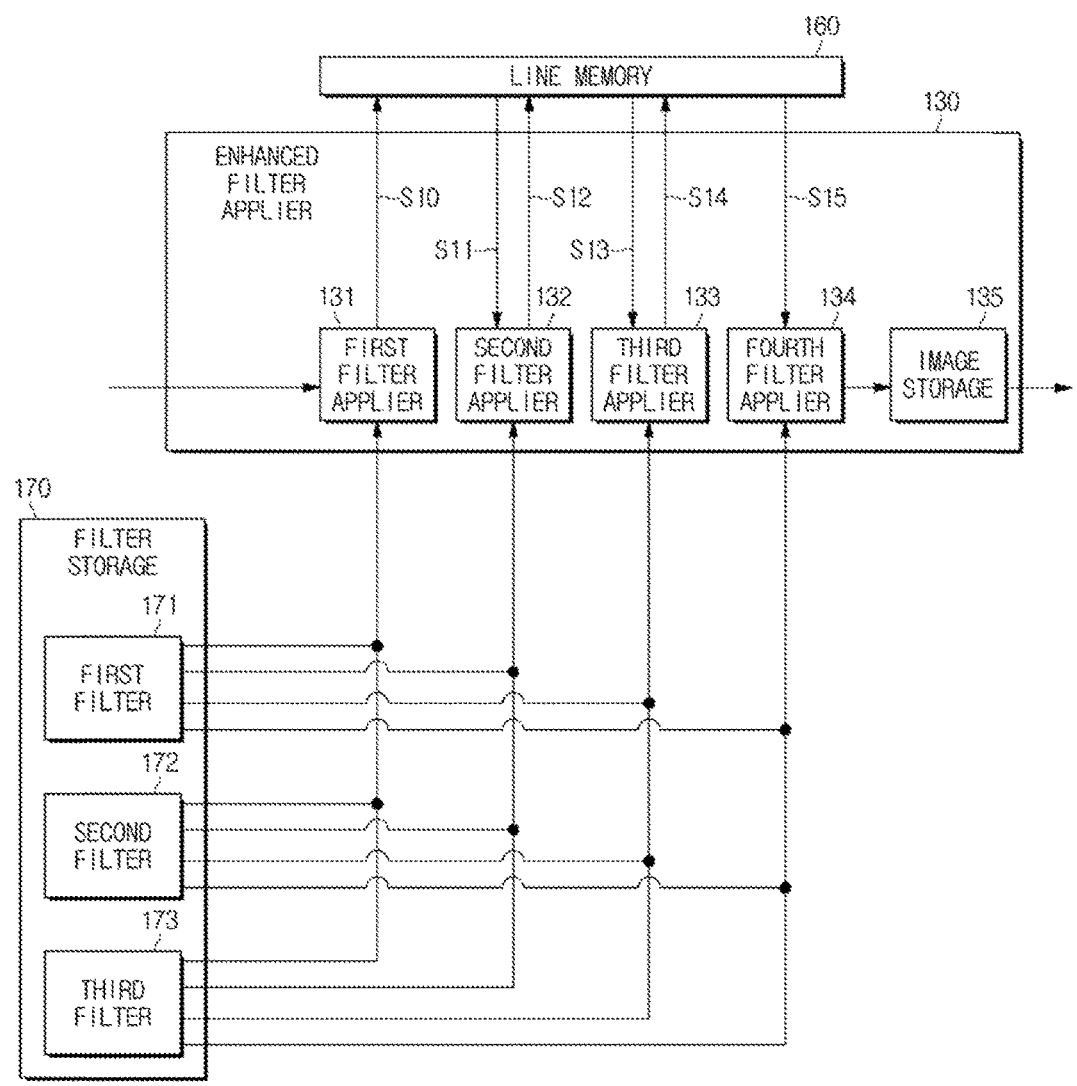
FIG. 7 is a block diagram of an enhanced filter applier, according to an exemplary embodiment.

The filter storage 170 may store information about various filters 171 to 173 of FIG. 7 required for filtering to be performed by the image processor 120. Filters 171 to 173 stored in the filter storage 170 may include a filter that outputs an image without change, a filter that increases sharpness of an image, a filter that applies a blur effect to an image, etc.

At the call of the image processor 120, the filter storage 170 provides at least one of the aforementioned filters for the image processor 120 to correct the entire or part of an image. The filters 171, 172, 173 stored in the filter storage 170 may include at least one of a filter that uses a non-expanded window 171*a*, 172*a*, 173*a* of FIG. 14, and a filter that uses an expanded window 171*b*, 172*b*, 173*b* of FIG. 14.

Detailed description of the filter storage 170 and the filters 171 to 173 will be described later.

The image output unit 180 may output an image 13 processed by the image processor 120. The image output unit 180 may include a display panel 181 that forms an image. The display panel 181 may emit some of rays provided from outside, or emit light by itself to create and provide a certain image for the user. The display panel 181 may be implemented by employing one of e.g., a Liquid Crystal Display (LCD) panel, an LED display panel, an OLED display panel, and an AMOLED display panel. The image output unit 180 may further include a backlight unit 182 as needed for providing light for the display panel 181. Specifically, in a case that the display panel 181 is an LCD panel, the backlight unit 182 may emit light in a certain color, e.g., white light or blue light, which is then incident on a face of the display panel 181, and the display panel 181 may then output a certain image according to the incident light.

The sound data processing unit 190 may process the sound data s2 in various ways, such as by restoring the sound data s2 divided by the demultiplexer 115 into a format to be reproduced by the sound output unit 191, by amplifying the sound data s2 to a certain amplitude, by modifying the beat or amplitude of the sound data s2, by performing filtering on the sound data s2, by changing an energy level of the sound data s2, or by creating a sound by mixing a plurality of different sounds. In an exemplary embodiment, the sound data processing unit 190 may use the meta data m2 to perform sound data processing. The sound data processed by the sound data processing unit 190 may be sent to the sound output unit 191.

The sound output unit 191 may output a sound corresponding to the sound data to provide acoustic information for the user of the display device 100a. The sound output unit 191 may include e.g., a speaker, an earphone, or a headphone, among which the speaker may provide a sound to the user by converting the sound data, which is an electric signal, to corresponding vibration and by radiating the vibration into the air. The display device 100a may include a plurality of speakers, and the respective speakers may output different sound, enabling stereoscopic sound to be produced. The speaker may include a woofer and a speaker for low and middle sound.

The controller 192 may control general operation of the display device 100a. For example, the controller 192 may send control signals to the receiver 110, the demodulator 114, the demultiplexer 115, the image processor 120, the line memory 160, the image output unit 180, the sound data processing unit 190, and the sound output unit 191 to control their respective operation. This may enable image processing as described above, may enable a still image or a moving image that went through the image processing to be displayed for the user through the image output unit 180, or may enable a sound to be provided for the user through the sound output unit 191. The controller 191 may generate control signals using information stored in the storage 193, and send the control signals to the receiver 110, the demodulator 114, the demultiplexer 115, the image processor 120, the line memory 160, the image output unit 180, the sound data processing unit 190, and the sound output unit 191. The controller 15 may include a processor that may be implemented with one or more semiconductor chips and associated components.

The storage 193 may store various instructions or information required for operation of the display device 100a, or various data related to images or sounds. The storage 193 may temporarily or permanently store an image processed by the image processor 120 before the image is output through the image output unit 180. Furthermore, the storage 193 may temporarily or permanently store a sound processed by the sound data processing unit 190 before the sound is output through the sound output unit 191. The storage 193 may be implemented using a semiconductor storage device, a magnetic disk storage device, or an optical disk storage device.

Various exemplary embodiments of the image processor 120 will now be described in more detail in connection with FIGS. 6 to 29.

Figure 6:
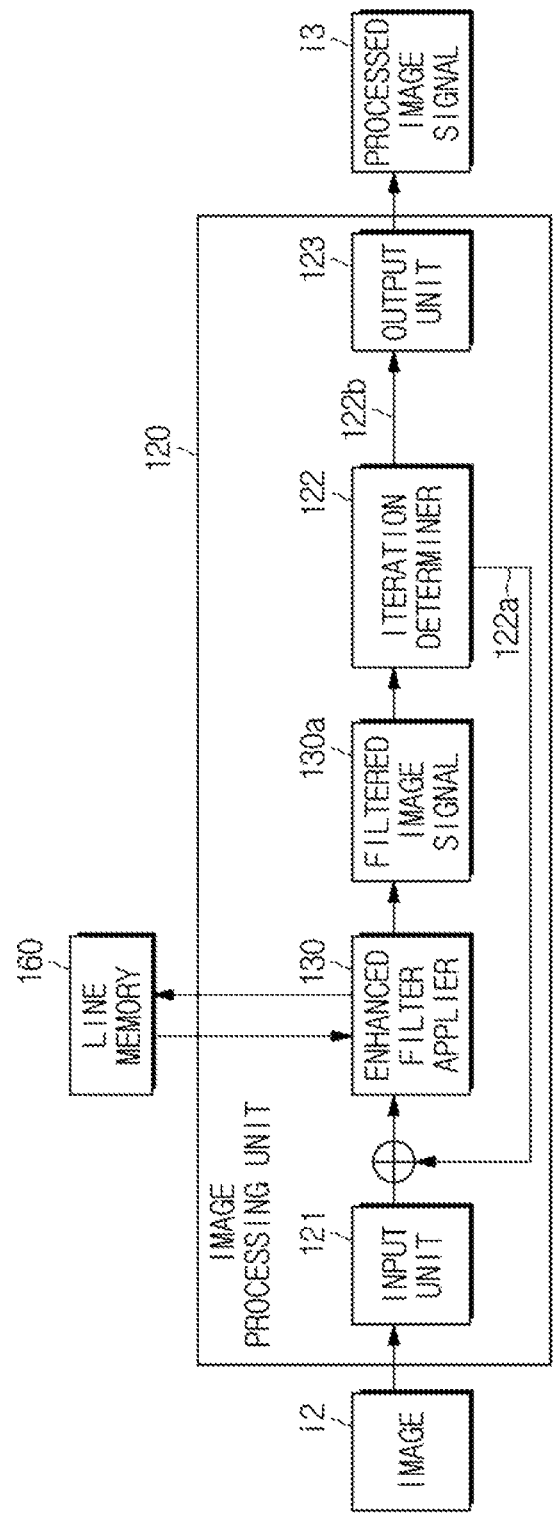
FIG. 6 is a block diagram of an image processor, according to an exemplary embodiment.

FIG. 6 is a block diagram of an image processor, according to an exemplary embodiment of the present disclosure.

Referring to FIG. 6, the image processor 120 may include an input unit 121, an iteration determiner 122, an output unit 123, an enhanced filter applier 130.

The input unit 121, the iteration determiner 122, the output unit 123, and the enhanced filter applier 130 may be logically and/or physically separated from one another. If they are physically separated, the input unit 121, the iteration determiner 122, the output unit 123, and the enhanced filter applier 130 may be implemented in at least one hardware device, e.g., in respective hardware devices. The hardware device may include a semiconductor chip that operates as a processor, and associated components.

At least two of the input unit 121, the iteration determiner 122, the output unit 123, and the enhanced filter applier 130 may be electrically connected to one another via circuits or wires, and accordingly, may be able to send data in the form of electric signals.

The input unit 121 may receive image data i2 output from the demultiplexer 115, and forward the received image data i2 to the enhanced filter applier 130, in which case, the input unit may convert the received image data i2 into a computable signal level as needed and send the result to the enhanced filter applier 130. The input unit 121 may be a logical or physical arrangement. For example, the input unit 121 may be implemented with input pins mounted on a semiconductor chip.

The enhanced filter applier 130 may filter an image corresponding to the image data i2 by applying at least one filter to the image data i2 sent from the input unit 121, and send image data 130a corresponding to the filtered image to the iteration determiner 122.

In an exemplary embodiment, the enhanced filter applier 130 may correct the corresponding image by applying a filter one time for the image data i2, or by applying the filter multiple times for the image data i2. In the latter case of applying the filter multiple times, the multiple filters may be the same filter, or different filters, or some of them is the same while others are different. The enhanced filter applier 130 may call at least one filter 171 to 173 from the filter storage 170, and then perform filtering by applying the called filter to the image data i2. The enhanced filter applier 130 may correct the image corresponding to the image data i2 while exchanging electric signals with the line memory 160. Details of the enhanced filter applier 130 will be described later.

The iteration determiner 122 may determine whether to iteratively perform additional filtering on the received image 130a. In this regard, the iteration determiner 122 may determine whether to iteratively perform additional filtering to minimize an error that occurs in filtering, e.g., a white Gaussian error.

In an exemplary embodiment, the iteration determiner 122 may determine whether to iterate filtering to minimize an error by using a minimum mean square error (MMSE). Furthermore, the iteration determiner 122 may determine whether to iterate filtering e.g., by comparing the filtered image data 130a with predetermined data or threshold, or by using a cost function or least square estimation (LSE).

Once determining to iterate filtering, the iteration determiner 122 may send the filtered image data 130a back to the enhanced filter applier 130 to perform additional filtering on the image data 130a filtered by the enhanced filter applier 130. In other words, the iteration determiner 122 may send the filtered image data 130a back to the enhanced filter applier 130 (122a) to iteratively apply a filter or filters 171 to 173 stored in the filter storage 170 to the image. On the contrary, if the iteration determiner 122 determines that no further iteration is required, the iteration determiner 122 may send the received filtered image data 130a to the output unit 123 (122b) to output finally processed image data i3. In this case, the filtered image data 130a sent to the output unit 123 may be a signal corresponding to an image that went through one-time filtering or iterative multiple filtering by the enhanced filter applier 130. In the latter case of the iterative multiple filtering, the number of filtering processes may be about e.g., two to four, or more as needed.

The output unit 123 may output the image data 122b received from the iteration determiner 122 to send the finally processed image data i3 to the image output unit 180 or the controller 192. If the image data i3 is sent to the controller 192, the controller 192 may generate control signals for the display panel 181, or the display panel 181 and backlight unit 182 based on the received image data i3, and may send the control signals to corresponding components for the image output unit 180 to output an image corresponding to the finally processed image data i3.

The enhanced filter applier 130 will now be described in more detail.

FIG. 7 is a block diagram of an enhanced filter applier, according to an exemplary embodiment of the present disclosure, and FIG. 8 is a diagram for explaining image processing and a line memory.

Referring to FIG. 7, the enhanced filter applier 130 may include at least one filter applier 131 to 134 to apply at least one filter to image data, and an image storage 135 for storing the filtered image data.

The at least one filter applier 131 to 134 may each obtain a filtered image by independently applying a filter to a received image. The at least one filter applier 131 to 134 may perform filtering with at least one filter 171 to 173 stored in the filter storage 170.

In some exemplary embodiments, the enhanced filter applier 130 may include a single filter applier or a plurality of filter appliers 131 to 134 as shown in FIG. 7. For example, the enhanced filter applier 130 may include four filter appliers 131 to 134. The plurality of filter appliers 131 to 134 may filter an image to obtain a filtered image by sequentially applying at least one filter for the image. The plurality of filter appliers 131 to 134 may be physically or logically separated, and in the case that they are physically separated, the plurality of filter appliers 131 to 134 may be implemented with their respective processors. In the case that they are logically separated, the plurality of filter appliers 131 to 134 may be implemented with a single processor. In other words, a single processor may perform the respective functions of the plurality of filter appliers 131 to 134.

In the following, for convenience of explanation, an exemplary embodiment of the enhanced filter applier 130 with four filter appliers 131 to 134 will be described. In this exemplary embodiment, the respective filter appliers 131 to 134 are called a first filter applier 131, a second filter applier 132, a third filter applier 133, and a fourth filter applier 134 in the order that the filters 171 to 173 are applied.

The first filter applier 131 may receive image data i input through the input unit 121 or filtered image data 130a sent from the iteration determiner 122, and may apply at least one filter 171 to 173 to the received image data.

Specifically, the first filter applier 131 may call one of the first to third filters 171 to 173 stored in the filter storage 170, and may use the called filter to perform filtering. The first to third filters 171 to 173 may be different from one another.

In an exemplary embodiment, the first to third filters 171 to 173 may include filters to increase, maintain, and decrease sharpness of images.

For example, the first filter 171 may include a high frequency filter to enhance sharpness of images, such as an unsharp filter, an edge enhancement filter, or a high pass filter. With the first filter 171 applied, high-frequency components are enhanced to sharpen the edges in an image i20. Accordingly, as the edges become more sharpened, the entire or part of the image i20 to which the first filter 171 is applied may appear clear as if it were relatively better focused.

Furthermore, for example, the second filter 172 may include a medium-frequency filter that keeps input image data unchanged, such as a bypass filter. With the second filter 172 applied, the image i20 to which the second filter 172 is applied may be approximately the same as one before the second filter 171 was applied thereto.

Moreover, for example, the third filter 173 may include a low frequency filter, such as a low pass filter that adds a blur effect to an image by decreasing sharpness while increasing smoothness. With the third filter 173 applied, high frequency components of the image i20 become weakened so that the edges in the image i20 may be represented to be relatively blurred. Accordingly, the edges of the image i20 become relatively smoothened, and part of the image i20, to which the third filter 173 is applied, may appear relatively less focused.

In addition to what are described above, the filters 171 to 173 stored in the filter storage 170 may include other various filters that may be considered by the designer.

Referring to FIG. 8, an image i20 may include a plurality of pixels P11 to P1m, which are arrayed in the form of a matrix. The pixels P11 to P1m may be arrayed in a plurality of rows (I) and columns (m).

Each pixel P11 to P1m may have image data to be output through the image output unit 180, and the image data may include information regarding brightness or color. Combinations of image data including brightness and color values may form at least one image i20 that may be visually perceived by the viewer.

The first filter applier 131 may perform filtering on image data of the plurality of pixels P11 to P1m. In this case, the first filter applier 131 may perform filtering on each pixel P11 to P1m, or on a group of pixels. In the case of filtering a group of pixels, the first filter applier 131 may perform filtering on pixels arranged in the same row, e.g., pixels P11 to P1m arranged in the first row, at the same time or at different times, or perform filtering on pixels arranged in multiple rows, e.g., first to eleventh rows P11 to Pbm (b=1) at the same time or at different times.

After completion of filtering, the first filter applier 131 may send the filtered image data to the line memory 160, which may, in turn, store the filtered image data, in step s10

In an exemplary embodiment, the first filter applier 131 may send image data, which is obtained by performing filtering on image data of a group of pixels, to one of multiple line memories 161 to 169 while sending image data, which is obtained by performing filtering on image data of in another group of pixels, to another of the line memories 161 to 169, thereby enabling the respective line memories 161 to 169 to store the corresponding filtered image data.

For example, image data, which is obtained by the first filter applier 131 performing filtering on image data of pixels P11 to P1m arrayed in the first row, may be stored in the first line memory 161, and image data, which is obtained by the first filter applier 131 performing filtering on image data of pixels P21 to P2m arrayed in the second row, may be stored in the second line memory 162. Similarly, image data resulting from filtering on pixels arrayed in the $n^{th}$ row, may be stored in the $n^{th}$ line memory 169. The number n of the line memories does not have to be greater than the number I of rows of pixels that constitute the image i20. In other words, the number n of the line memories may be smaller than the number of rows of pixels that constitute the image i20. In an exemplary embodiment, the number n of the line memories may be smaller than the number I of pixels in the vertical direction, and may be, for example, 11. In another exemplary embodiment, the number n of the line memories may correspond to the vertical length of a filtering window, which will be described later.

The entire or part of an image stored in the line memory 160 and filtered by the first filter applier 131 is sent to the second filter applier 132, in step s11.

The second filter applier 132 may receive the entire or part of the image filtered by the first filter applier 131 from the line memory 160 (161 to 169), and may apply at least one filter 171 to 173 to the entire or part of the image received.

Specifically, the second filter applier 132 may call one of the first to third filters 171 to 173 stored in the filter storage 170, and may use the called filter to perform filtering. The first to third filters 171 to 173 may be different from one another. As described above, the first to third filters 171 to 173 may be a high pass filter, a bypass filter, and a low pas filter, respectively, and in addition, may include other various filters that may be considered by the designer.

In an exemplary embodiment, the second filter applier 132 may filter the entire or part of the image with the same filter as one used by the first filter applier 131. For example, if the first filter applier 131 has performed filtering with the first filter 171, e.g., an unsharp filter, the second filter applier 132 may also use the first filter 171, e.g., the unsharp filter to perform filtering.

In another exemplary embodiment, the second filter applier 132 may filter the entire or part of the image with a different filter from the one applied by the first filter applier 131 to the image. For example, the first filter applier 131 may perform filtering with the first filter, e.g., an unsharp filter, and the second filter applier 132 may perform filtering with the third filter 172, e.g., a low pass filter, which is different from the first filter 171.

Similar to the first filter applier 131, the second filter applier 132 may also perform filtering on every image data of a plurality of pixels P11 to P1m, in which case, the second filter applier 132 may perform filtering on each pixel P11 to P1m or on a group of pixels. In case of filtering a group of pixels, the second filter applier 132 may perform filtering on e.g., pixels P11 to P1m arrayed in the same row, or on pixels P11 to Pbm arrayed in multiple rows.

After completion of filtering, the second filter applier 132 may send the filtered image data to the line memory 160, which may, in turn, store the filtered image data, in step s12. For example, the filtered image data obtained by the second filter applier 132 performing filtering on image data of a group of pixels e.g., pixels in multiple rows may be sent to and stored in the line memories 161 to 169 corresponding to the respective rows.

The entire or part of an image stored in the line memory 160 and filtered by the second filter applier 132 may be sent to the third filter applier 133, in step s13.

The third filter applier 133 may receive the entire or part of the image filtered by the second filter applier 132 from the line memory 160 (161 to 169), and may apply at least one filter 171 to 173 to the entire or part of the image received. Specifically, the third filter applier 133 may call one of the first to third filters 171 to 173 stored in the filter storage 170, and may use the called filter to perform filtering. The first to third filters 171 to 173 may be different from one another, and may be e.g., an unsharp filter, a bypass filter, and a low pass filter, respectively, as described above.

In an exemplary embodiment, the third filter applier 133 may filter the entire or part of the image with the same filter as one called by at least one of the first and second filter appliers 131 and 132. For example, the first to third filter appliers 131, 132, and 133 may all use the first filter 171, e.g., an unsharp filter in filtering.

In another exemplary embodiment, the third filter applier 133 may filter the entire or part of the image with a different filter from one called by at least one of the first and second filter appliers 131 and 132. For example, the first filter applier 131 may perform filtering with the first filter 171, e.g., an unsharp filter, the second filter applier 132 may perform filtering with the third filter 172, e.g., a low pass filter, which is different from the first filter 171, and the third filter applier 133 may perform filtering with the first filter 171 that has been used by the first filter applier 131 but not by the second filter applier 132.

The third filter applier 133 may also perform filtering on every image data of a plurality of pixels P11 to P1m, in which case, the third filter applier 133 may perform filtering on each pixel P11 to P1m or on a group of pixels. In case of filtering a group of pixels, the third filter applier 133 may perform filtering on e.g., pixels P11 to P1m arrayed in the same row, or on pixels P11 to Pbm arrayed in multiple rows.

After completion of filtering, the third filter applier 133 may send the filtered image data to the line memory 160, which may, in turn, store the filtered image data, in step s14. Similar to what is described above, the image data obtained by performing filtering on image data of a group of pixels e.g., pixels in multiple rows may be sent to and stored in the line memories 161 to 169 corresponding to the respective rows.

The entire or part of an image stored in the line memory 160 and filtered by the third filter applier 133 may be sent to a fourth filter applier 134, in step s15.

The fourth filter applier 133 may receive the entire or part of the image filtered by the third filter applier 133 from the line memory 160 (161 to 169), and may apply at least one filter 171 to 173 to the entire or part of the image received. The fourth filter applier 134 may use one of the first to third filters 171 to 173 stored in the filter storage 170 to perform filtering, in which case the first to third filters 171 to 173 may be an unsharp filter, a bypass filter, and a low pass filter, respectively. Naturally, depending on the designer's selection, the first to third filters 171 to 173 may be any filters other than what are described above.

In an exemplary embodiment, the fourth filter applier 134 may filter the entire or part of the image with the same filter as one called by at least one of the first to third filter appliers 131 to 133. For example, the first to fourth filter appliers 131 to 134 may all use the first filter 171, e.g., an unsharp filter in filtering.

In another exemplary embodiment, the fourth filter applier 134 may filter the entire or part of the image with a different filter from one applied by at least one of the first to third filter appliers 131 to 133. For example, the first filter applier 131 may perform filtering with the first filter 171, e.g., an unsharp filter, the second filter applier 132 may perform filtering with the third filter 172, e.g., a low pass filter, which is different from the first filter 171, the third filter applier 133 may perform filtering with the first filter 171, and the fourth filter applier 143 may perform filtering with the low pass filter, which was used only by the second filter applier 132.

In the same way as described above, the fourth filter applier 134 may also perform filtering on each pixel P11 to P1m, or on a group of pixels. In case of filtering a group of pixels, the fourth filter applier 134 may perform filtering on e.g., pixels P11 to P1m arrayed in the same row, or on pixels P11 to Pbm arrayed in multiple rows.

After completion of filtering, the fourth filter applier 134 may send the filtered image data not to the line memory 160 but to the image storage 135.

The image storage 135 is configured to store the image data filtered multiple times by the first to fourth filter appliers 131 to 134. The image storage 135 may be implemented using a semiconductor storage device, a magnetic disk storage device, or an optical disk storage device. The image storage 135 may be omitted as needed. It is also possible that the image storage 135 is implemented by the line memory 160 or by a separate storage 193.

The image data stored in the image storage 135, i.e., the image data filtered multiple times may be sent to the iteration determiner 122. The iteration determiner 122 may determine whether to perform additional filtering, as described above. If it is determined to perform additional filtering, the image data filtered multiple times may be sent back to the first filter applier 131, which may, in turn, iteratively perform filtering in the same way as described above, and then store the filtered image data back in the line memory 160. The second to fourth filter appliers 132 to 134 may also iteratively perform filtering in this way, and then send the iteratively filtered image data to the line memory 160 or to the image storage 135. The iteratively filtered image data sent to the image storage 135 may be forwarded to the iteration determiner 122.

In the following, exemplary embodiments where the first to fourth filter appliers 131 to 134 use a window-based filter will be described.

Figure 9:
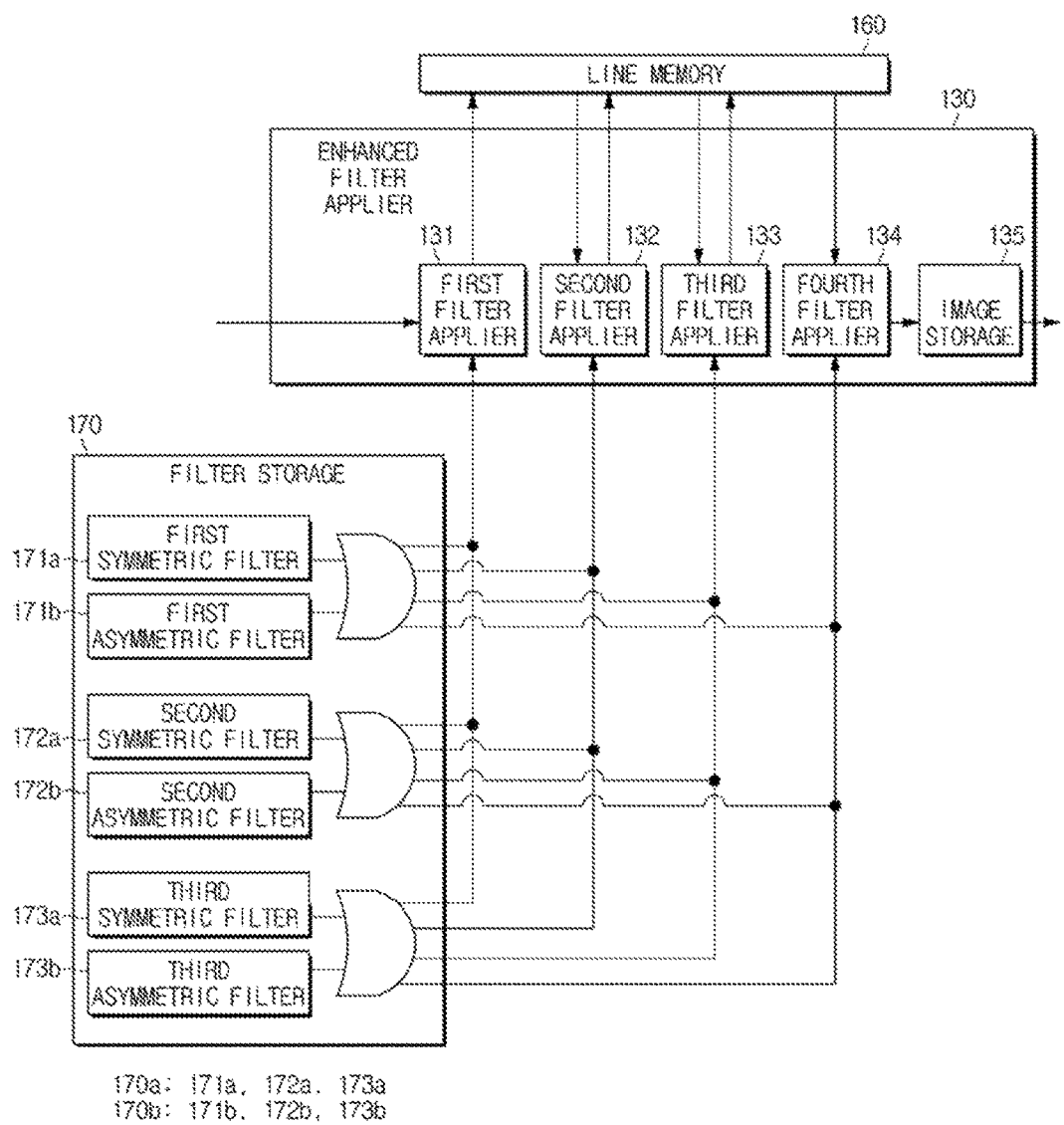
FIG. 9 is a block diagram of an enhanced filter applier, according to another exemplary embodiment.
Figure 10:
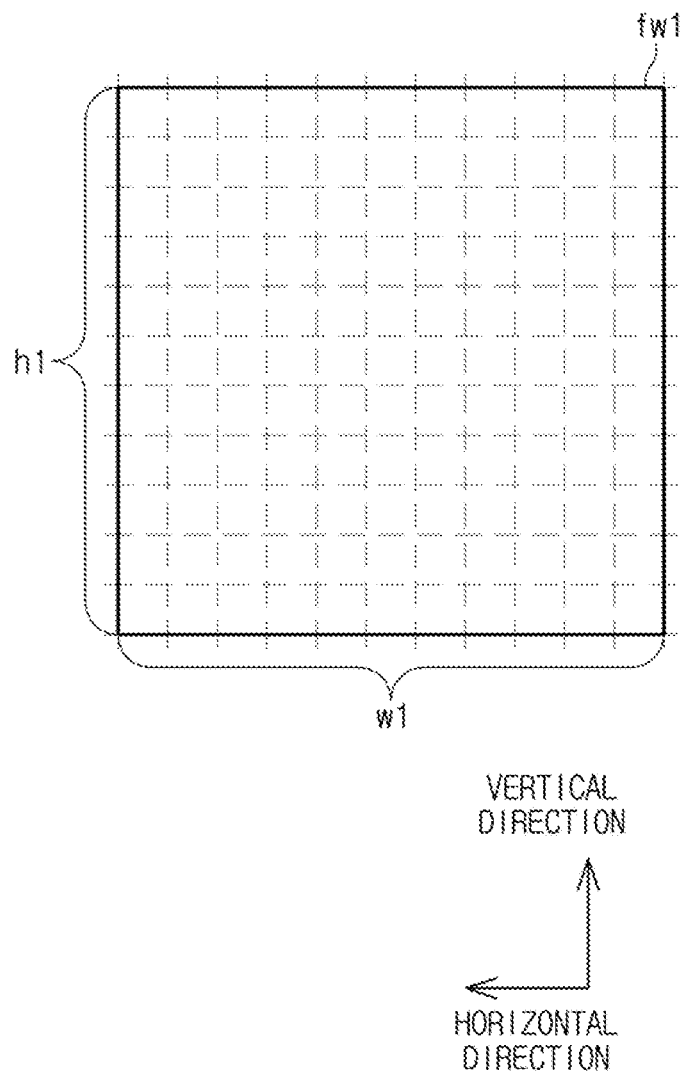
FIG. 10 illustrates a filtering window, according to an exemplary embodiment.
Figure 11:
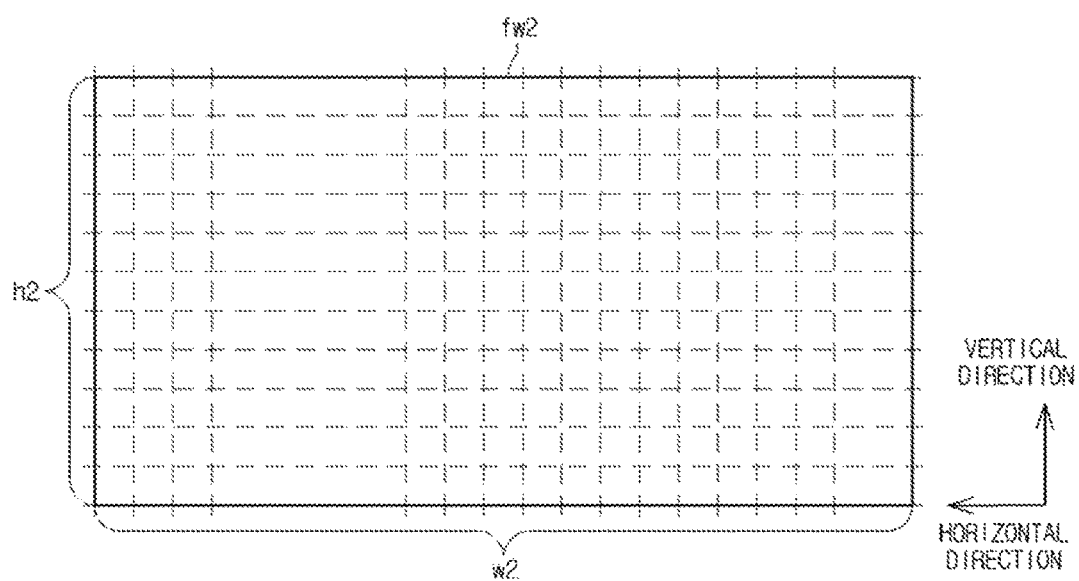
FIG. 11 illustrates a filtering window, according to another exemplary embodiment.

FIG. 9 is a block diagram of an enhanced filter applier, according to another exemplary embodiment of the present disclosure, and FIG. 10 illustrates a filtering window, according to an exemplary embodiment of the present disclosure. FIG. 11 illustrates a filtering window, according to another exemplary embodiment of the present disclosure.

Referring to FIG. 9, at least one of the first to fourth filter appliers 131 to 134 may filter an image by applying a filter to a region in the image. In other words, at least one of the first to fourth filter appliers 131 to 134 may select a region and perform filtering on the selected region. Specifically, at least one of the first to fourth filter appliers 131 to 134 may filter an image by repeating a process of performing filtering on the selected region and performing filtering on another region different from the selected region. The selected region and other region may partially overlap, or may not overlap at all.

In an exemplary embodiment, filters 170a, 170b may each be implemented by using a filtering window fw1, fw2 designed to cover a particular region to be filtered.

Specifically, the filtering window fw1, fw2 serves to set a region in the image i20, on which a filtering process is to be performed, and to distinguish the region from another. In other words, the region in the image, to which the filtering window fw1, fw2 is applied, is filtered while the other region, to which the filtering window fw1, fw2 is not applied, is not filtered.

The filtering window fw1, fw2 may have the form of a square to correspond to the shape of the image i20, but in some other exemplary embodiments, it may have other various forms, such as a circle, an oval, or a diamond.

In an exemplary embodiment, a filtering window fw1 may have the form of a square, as shown in FIG. 10. Specifically, the filtering window fw1 may be a symmetric filtering window with height h1 and width w1, which are in the same size.

When the symmetric filtering window fw1 is applied to an image, Q pixels in the horizontal direction and Q pixels in the vertical direction, i.e., Q×Q pixels (where Q is a natural number from 1) are located within the symmetric filtering window fw1. Accordingly, when the filter 171a, 172a, 173a that uses the symmetric filtering window fw1 is applied to an image, Q×Q pixels of a region in the image may be filtered.

The size of the symmetric filtering window fw1 may be defined by the number of columns and rows of pixels located within the symmetric filtering window fw1. For example, in the case that Q×Q pixels are located within the symmetric filtering window fw1, the size of the symmetric filtering window may be defined to be Q×Q. The size of the symmetric filtering window fw1 may be arbitrarily determined by the designer's selection. For example, the symmetric filtering window fw1 may have a size of 11×11. In this case, pixels arrayed in a 11×11 matrix may be located within the symmetric filtering window fw1, and accordingly, a total of 121 pixels are placed within the symmetric filtering window fw1.

The filtering window fw2 may have the form of a rectangle, as shown in FIG. 11. Specifically, the filtering window fw2 may be an asymmetric filtering window with height h2 and width w2, which are in different size.

When the asymmetric filtering window fw2 is applied to an image, P pixels in the horizontal direction and Q pixels in the vertical direction, i.e., P×Q pixels (where P and Q are natural numbers, P≠Q) are located within the asymmetric filtering window fw2. Accordingly, when the filter 171b, 172b, 173b that uses the asymmetric filtering window fw2 is applied to an image, P×Q pixels of a region in the image may be filtered. If P is greater than Q, the asymmetric filtering window fw2 may have the form of a rectangle, which is elongated in the horizontal direction. With this asymmetric filtering window fw2, more pixels in the same row may be filtered than with the symmetric filtering window fw1. Specifically, Q pixels in a row is filtered when the symmetric filtering window fw1 is used, while P (P>Q) pixels in the same row is filtered when the asymmetric filtering window fw2 is used.

The size of the asymmetric filtering window fw2 may also be defined by the number of pixels located within the asymmetric filtering window fw2, as described above. The size of the asymmetric filtering window fw2 may be arbitrarily determined by the designer's selection. For example, the asymmetric filtering window fw2 may have a size of 71×11, in which case 11 pixels in the vertical direction and 71 pixels in the horizontal direction, i.e., pixels arrayed in a matrix of 71×11, are located within the asymmetric filtering window fw2. That is, a total of 781 pixels are located within the asymmetric filtering window fw2 in the size of 71×11. Accordingly, if the filter 171b, 172b, 173b that has the asymmetric filtering window fw2 is applied, 781 pixels are filtered.

In an exemplary embodiment, in a case that image processing is performed using the filtering window fw1, fw2, at least one of the first to fourth filter appliers 131 to 134 may perform filtering on pixels of particular data by using data of one or more pixels located within the filtering window fw1, fw2. For example, at least one of the first to fourth filter appliers 131 to 134 may further use one or more other pixels adjacent to a particular pixel to filter the particular pixel located within the filtering window fw1, fw2.

Furthermore, at least one of the first to fourth filter appliers 131 to 134 may perform filtering by further using data of at least one pixel located outside the filtering window fw1, fw2 as needed. Especially, in case of filtering a pixel around the edges of the filtering window fw1, fw2, at least one of the first to fourth filter appliers 131 to 134 may perform filtering by further using data of at least one of the pixels located outside the filtering window fw1, fw2. This will be described later.

In an exemplary embodiment, the filtering storage 170 may store a filter 171a, 172a, 173a (hereinafter, referred to as a symmetric filter) that uses the aforementioned symmetric filtering window fw1, and a filter 171b, 172b, 173b (hereinafter, referred to as an asymmetric filter) that uses the asymmetric filtering window fw2.

The filtering storage 170 may store a symmetric filter that uses a plurality of symmetric filtering windows fw1. For example, the filter storage 170 may store a first symmetric filter 171a, a second symmetric filter 172a, and a third symmetric filter 173a, which may be used to perform image filtering differently. In this case, the first symmetric filter 171a may include a filter to enhance sharpness of an image, such as an unsharp filter, an edge enhancement filter, or a high pass filter; the second symmetric filter 172a may include a filter to keep input image data unchanged, such as a bypass filter; the third symmetric filter 173a may include a filter to decrease sharpness of an image, such as a low pass filter.

Furthermore, the filtering storage 170 may store an asymmetric filter that uses a plurality of asymmetric filtering windows fw2. For example, the filtering storage 170 may store a first asymmetric filter 171b, a second asymmetric filter 172b, and a third asymmetric filter 173b. The first, second, and third asymmetric filters 171b, 172b, and 173b may be used to perform different image filtering. In an exemplary embodiment, the first asymmetric filter 171b may include a filter to enhance sharpness of an image, such as an unsharp filter, an edge enhancement filter, or a high pass filter; the second asymmetric filter 172b may include a filter to keep input image data unchanged, such as a bypass filter; the third asymmetric filter 173b may include a filter to decrease sharpness of an image, such as a low pass filter.

In an exemplary embodiment, the first filter applier 131 may perform filtering on an image with at least one of the first to third symmetric filters 171a, 172a, and 173a and the first to third asymmetric filters 171b, 172b, and 173b, which are stored in the filtering storage 170. For example, the first filter applier 131 may perform filtering with the first asymmetric filter 171b arrayed in the form of a 71×11 matrix for performing sharpness enhancement filtering.

Similar to the first filter applier 131, the second filter applier 132 may perform filtering on an image with at least one of the first to third symmetric filters 171a, 172a, and 173a and the first to third asymmetric filters 171b, 172b, and 173b, which are stored in the filtering storage 131, and in this case, the second filter applier 132 may perform filtering with the same filter as the filter used by the first filter applier 131, or may perform filtering with a different filter from the filter used by the first filter applier 131.

Similar to the first and second filter appliers 131 and 132, the third filter applier 133 may perform filtering on an image with at least one of the first to third symmetric filters 171a, 172a, and 173a and the first to third asymmetric filters 171b, 172b, and 173b, which are stored in the filtering storage 131.

The third filter applier 133 may perform filtering with the same filter as the filter used by at least one of the first and second filter appliers 131 and 132, or may perform filtering with a different filter from the filters used by the first and second filter appliers 131 and 132.

Similar to the first to third filter appliers 131 to 133, the fourth filter applier 134 may perform filtering on an image with at least one of the first to third symmetric filters 171a, 172a, and 173a and the first to third asymmetric filters 171b, 172b, and 173b, which are stored in the filtering storage 131. Similarly, the fourth filter applier 134 may perform filtering with the same filter as the filter used by at least one of the first to third filter appliers 131 to 133, or may perform filtering with a different filter from the filters used by the first to third filter appliers 131 to 133.

Whether the respective first to fourth filter appliers 131 to 134 is to use the symmetric filter 170a or the asymmetric filter 170b may be determined in advance. In this case, the first to fourth filter appliers 131 to 134 may be designed to use one of the symmetric filter 170a and the asymmetric filter 170b under the control of the external controller 192.

Figure 12:
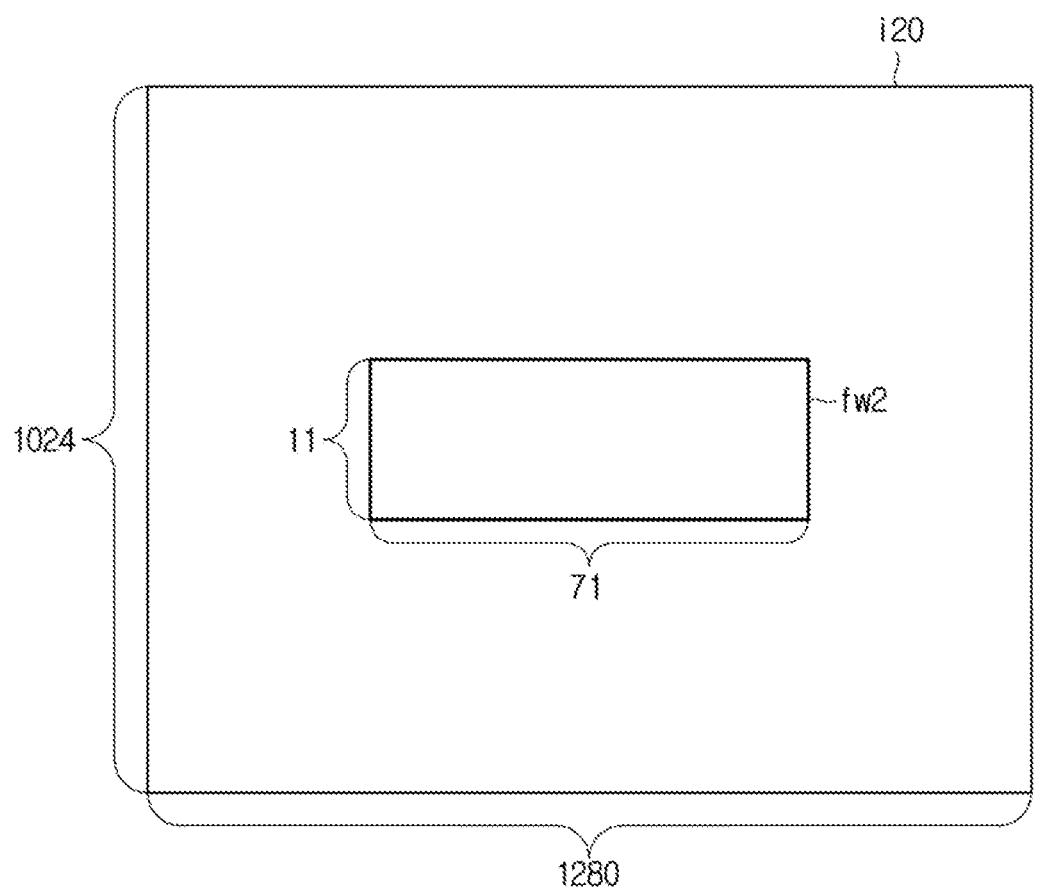
FIG. 12 is a first diagram for explaining image processing using a filtering window, according to an exemplary embodiment.
Figure 13:
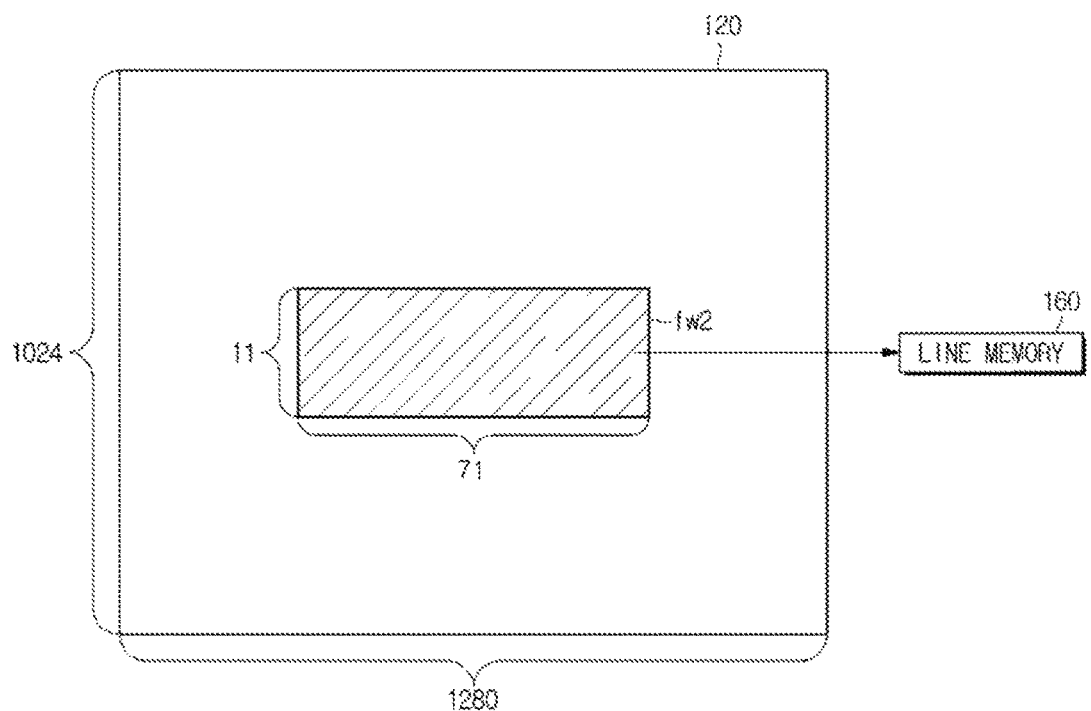
FIG. 13 is a second diagram for explaining image processing using a filtering window, according to an exemplary embodiment.

FIG. 12 is a first diagram for explaining image processing using a filtering window, and FIG. 13 is a second diagram for explaining image processing using a filtering window. FIGS. 12 and 13 show an example where the filter 170b that uses a 71×11 asymmetric window is applied to an image i20 having 1280 pixels in the horizontal direction and 1024 pixels in the vertical direction.

Referring to FIGS. 12 and 13, a particular region in the image i20 may be selected for filtering by using a filtering window, e.g., an asymmetric filtering window fw2. At least one of the first to four filter appliers 131 to 134 may perform filtering by applying one of the first to third filters 171 to 173 to a region to which the asymmetric filtering window fw2 is applied. In this case, at least one of the first to fourth filter appliers 131 to 134 may increase sharpness of the region, to which the asymmetric filtering window fw2 is applied, may maintain sharpness of the region, or may smoothen the image of the region by decreasing sharpness of the region.

Once the pixels located within the filtering window fw2 are filtered, image data resulting from the filtering may be sent to the line memory 160, which may, in turn, store the image data. The filtered image data sent to the line memory 160 may be forwarded to other filter appliers 132 to 134, as shown in FIG. 7.

If there are a plurality of line memories 161 to 169, the image data may be stored in the corresponding line memory 161 to 169. For example, image data obtained by filtering image data of pixels located in the top row within the filtering window fw2 is stored in the first line memory 161, and image data obtained by filtering image data of pixels located in the next row may be stored in the second line memory 162. Image data obtained by filtering image data of pixels located in the lowest row may be stored in the $n^{th}$ line memory 169. For example, if the filtering window has a size of 71×11 as shown in FIG. 11, image data obtained by filtering pixels located in the 11'th row may be stored in the 11'th line memory. Image data stored in the first to $n^{th}$ line memories 161 to 169 may be sent to different filter appliers 132 to 134 sequentially or simultaneously.

Figure 14:
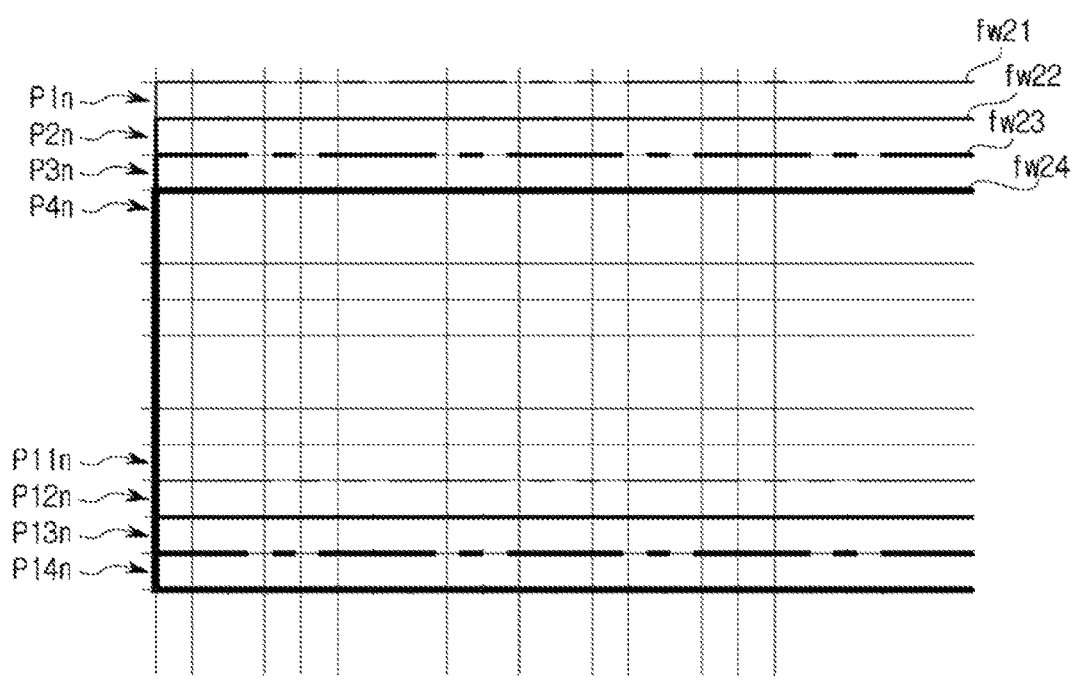
FIG. 14 is a third diagram for explaining image processing using a filtering window; according to an exemplary embodiment

FIG. 14 is a third diagram for explaining image processing using a filtering window.

At least one of the first to fourth filter appliers 131 to 134 may correct the entire or part of the image i20 by separately filtering each of a plurality of regions in the image i20. The plurality of regions may partially overlap with one another. In other words, at least two of the plurality of regions may overlap.

At least one of the first to fourth filter appliers 131 to 134 may filter the plurality of regions by sequentially applying at least one filter 170a, 170b that uses a filtering window fw1, fw2 to the plurality of regions to be filtered. In this case, at least two of the plurality of filtering windows fw21 to fw24 may overlap with each other, and accordingly, the respective regions to be independently filtered may partially overlap.

For example, as shown in FIG. 14, at least one of the first to fourth filter appliers 131 to 134 may perform filtering on an image by sequentially selecting regions in the image by using a plurality of filtering windows, e.g., the first to fourth filtering windows fw21 to fw24, and applying a certain filter 170a, 170b to the selected region. The first to fourth filtering windows fw21 to fw24 are distinguished based on locations of regions in the image selected by the filtering windows fw21 to fw24. Each ordinal number that comes before the term 'filtering window' is to clearly represent that the location of the region selected by the corresponding filtering window is different from others.

In an exemplary embodiment, the first to fourth filtering windows 171a to 171d may have the same size. However, even if the same size of filtering windows 171a to 171d are applied, it is not necessary to apply the same filter. For example, an unsharp filter may be applied to a region selected by the first filtering window 171a, and a bypass filter may be applied to a region selected by the second filtering window 171b.

For example, as shown in FIG. 14, if the filtering window has a size of K×11 (K is an arbitrary natural number greater than 11), at least one of the first to fourth filter appliers 131 to 134 may first apply an asymmetric filter 170b that uses the first filtering window fw1. The first filtering window fw1 may be one that covers pixels in the first to 11'th rows, P1n to P11n (n is a natural number between 1 to K). Accordingly, at least one of the first to fourth filter appliers 131 to 134 may perform filtering on image data corresponding to the pixels P1n to P11n located in the first to 11'th rows. The filtered image data may be sent to and stored in the line memory 160. The filtered image data sent to the line memory 160 may be forwarded to other filter appliers 132 to 134.

After the pixels P1n to P11n located in the first to 11'th rows are filtered and the filtered image data is sent to the line memory 160, at least one of the first to fourth filter appliers 131 to 134 may perform filtering on an image by applying a filter 170b that uses the second filtering window fw2 to a different location or a different region in the image before the image was filtered. In this case, some of the previously filtered regions and part of a region to be newly filtered may be overlapped with each other, and the first filter applier 131 may perform filtering again on the image data of the overlapping part, regardless of whether the image data of the overlapping part has been previously filtered.

Specifically, for example, the second filtering window 171b may be one that covers pixels located in rows, each of which is right below each of the previously selected rows. For example, the second filtering window 171b may be one that covers pixels located in rows, each of which is right below each of the previously selected first to 11'th rows, i.e., pixels P2n to P12n located in the second to 12'th rows. At least one of the first to fourth filter appliers 131 to 134 may perform filtering on image data of the pixels P2n to P12n located in the second to 12'th rows by applying the filter 170b that uses the second filtering window 171b to the pixels P2n to P12n located in the second to 12'th rows.

In this case, part of a region selected by the newly applied second filtering window 171b, e.g., a part having pixels P2n to P11n located in the second to 11'th rows may be overlapped with part of the region selected by the previous first filtering window 171a, as shown in FIG. 14. Accordingly, the same image data, i.e., the image data of pixels P2n to P11n located in the second to 11$^{th}$ rows may be filtered one more time. The filtered image data may be sent to and stored in the line memory 160.

After completion of filtering the pixels P2n to P12n located in the second to 12$^{th}$ rows, at least one of the first to fourth filter appliers 131 to 134 may apply the filter 170b using the third window 171c. For example, the third filtering window 171c may be one that covers pixels located in rows, each of which is right below each of the previously selected second to 12$^{th}$ rows, i.e., pixels P3n to P13n located in the third to 1'th rows. Accordingly, image data of the pixels P3n to P13n located in the third to 13$^{th}$ rows may also be filtered. The filtered image data of the pixels P3n to P13n located in the third to 13$^{th}$ rows may also be sent to and stored in the line memory 160.

Similar to what is described above, after completion of filtering the pixels P3n to P13n located in the third to 13$^{th}$ rows, at least one of the first to fourth filter appliers 131 to 134 may use the fourth filtering window 17c to select pixels P4n to P14n located in the fourth to 14$^{th}$ rows. As the filter is applied to the pixels within the fourth filtering window 171c, image data of the pixels P4n to P14n located in the fourth to 14$^{th}$ rows may be filtered. The filtered image data may be sent to and stored in the line memory 160.

Figure 15:
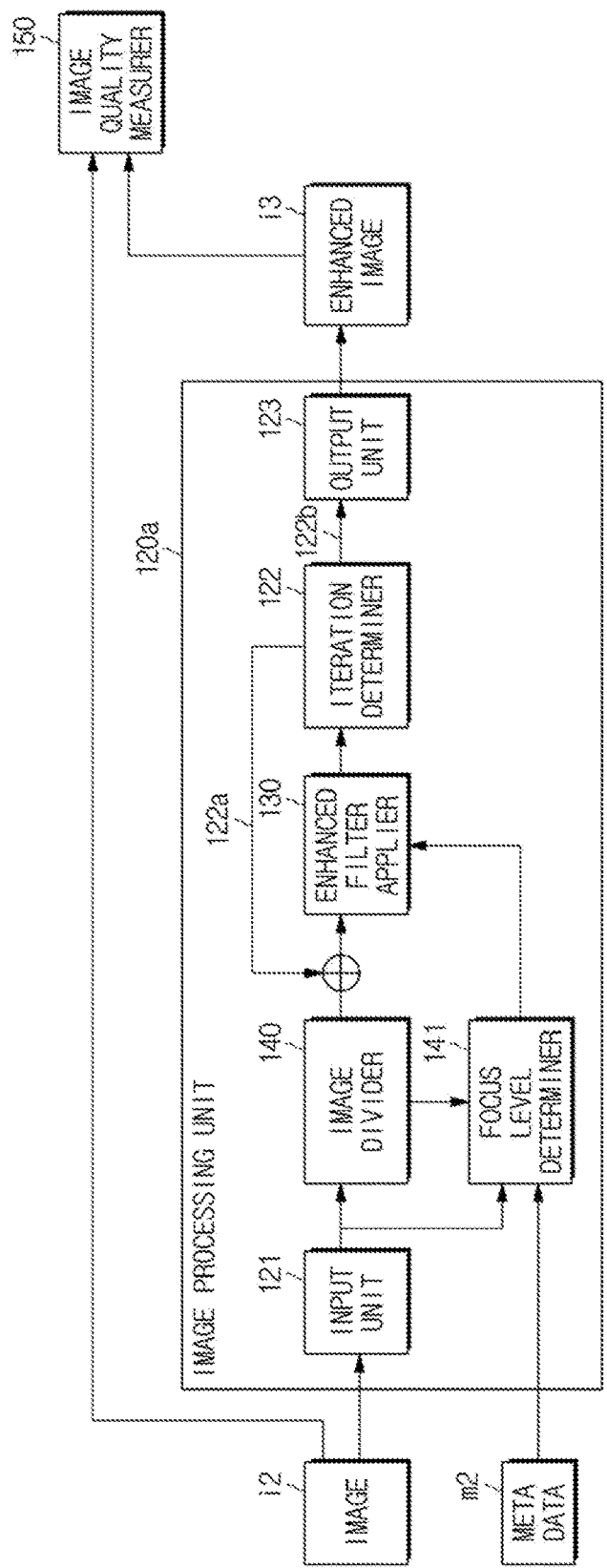
FIG. 15 is a block diagram of an image processor, according to another exemplary embodiment.

FIG. 15 is a block diagram of an image processor, according to another exemplary embodiment of the present disclosure.

Referring to FIG. 15, an image processor 120a may include an input unit 121, an iteration determiner 122, an output unit 123, an enhanced filter applier 130, an image divider 140, and a focus level determiner 141.

As described above, the input unit 121, the iteration determiner 122, the output unit 123, the enhanced filter applier 130, the image divider 140, and the focus level determiner 141 may be logically or physically separated. The input unit 121, the iteration determiner 122, the output unit 123, the enhanced filter applier 130, the image divider 140, and the focus level determiner 141 may be electrically connected to one another, and accordingly, may be able to send image data in the form of electric signals.

The input unit 121 may receive image data i2 output from the demultiplexer 115, and may forward the received image data i2 to the enhanced filter applier 130.

The enhanced filter applier 130 may filter an image corresponding to the image data i2 by applying at least one filter to the image data i2 sent from the input unit 121, and send image data 130a corresponding to the filtered image to the iteration determiner 122.

The iteration determiner 122 may receive image data 130a filtered by the enhanced filter applier 130, cancel noise or error that exists in the received filtered image data 130a, or determine whether to iteratively perform additional filtering on the received image 130a.

The output unit 123 may output the image data 122b received from the iteration determiner 122 to send the finally processed image data i3 to the image output unit 180 or the controller 192.

The input unit 121, iteration determiner 122, and output unit 123 were already described above, so further description about them will be omitted herein.

Referring to FIG. 15, the image divider 140 may be located between the input unit 121 and the enhanced filter applier 130. The image divider 140 may divide the image i2 input through the input unit 121 into two or more regions, and may send information about the divided image i2 or divided regions to the enhanced filter applier 130. In some exemplary embodiments, the image divider 140 may also send the information about the divided image i2 or divided regions to the focus level determiner 141.

The number of regions into which the image i2 is divided by the image divider 140 may be determined by a selection of the designer. For example, the image divider 140 may divide the image i2 into two, three, four, or more. The image divider 140 may divide the image i2 taking into account a viewing angle of the viewer.

Figure 16:
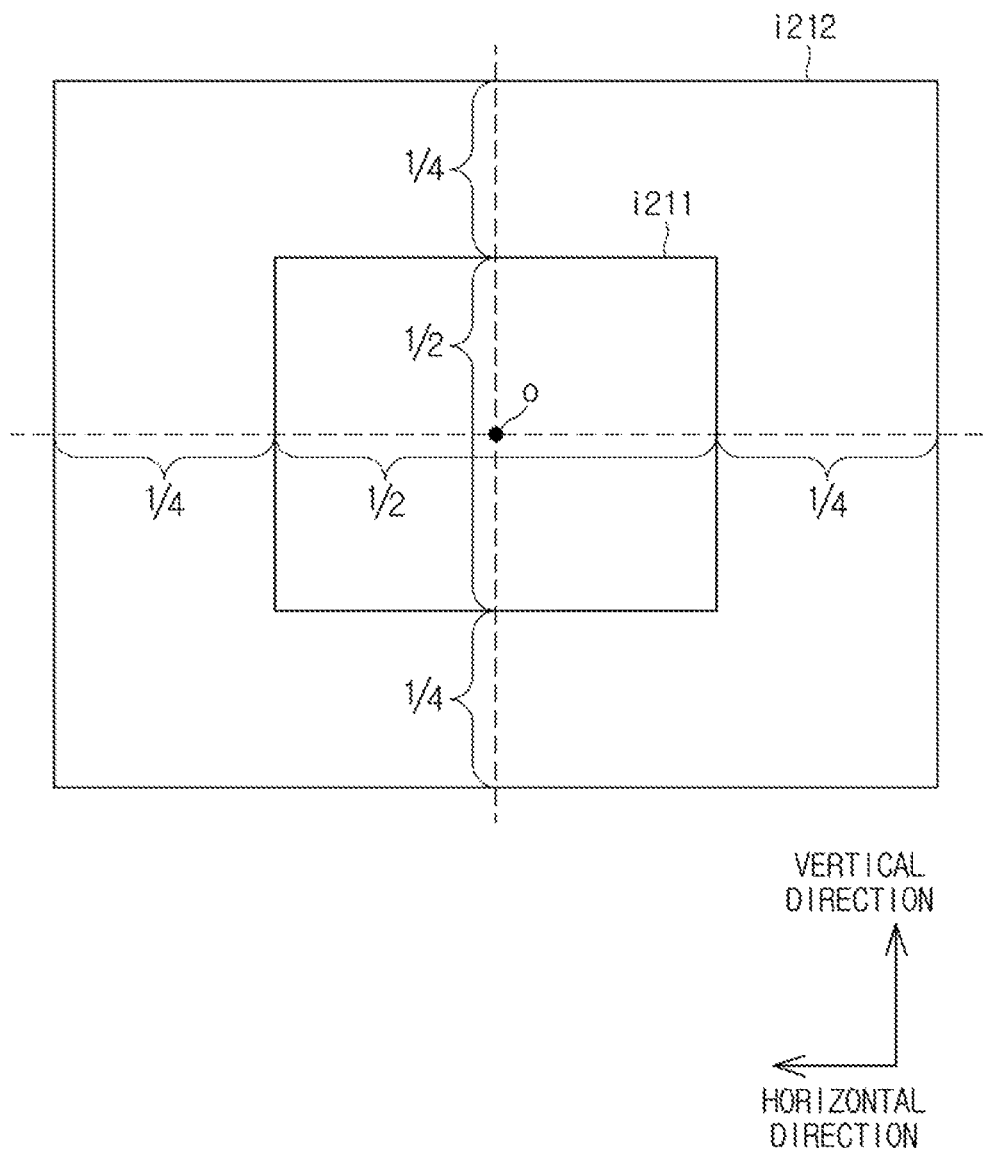
FIG. 16 shows an example of image division, according to an exemplary embodiment.

FIG. 16 shows an example of image division.

Referring to FIG. 16, the image divider 140 may divide the image i2 into two regions, e.g., a first region i211 and a second region i212. In this case, the image divider 140 may divide the image i2 such that the first region i211 is placed within the second region i212. More specifically, the image divider 140 may divide the image i2 such that the height and width of the first region i211 is half the size of the height and width of the second region i212 and the first and second regions i211 and i212 have the same center o.

Assuming that an image output from the image output unit 180 has ultrahigh resolution of 3840×2160, the size of a screen implemented by the image output unit 180 is about 55 inches, and a viewer is watching the image through the image output unit 180 two meters away, a viewing angle having the highest spatial resolution for the eyes of the viewer is about 0 to 20 degrees. With the division as shown in FIG. 16, the first region i211 may be located within the viewing angle having the highest resolution.

Figure 17:
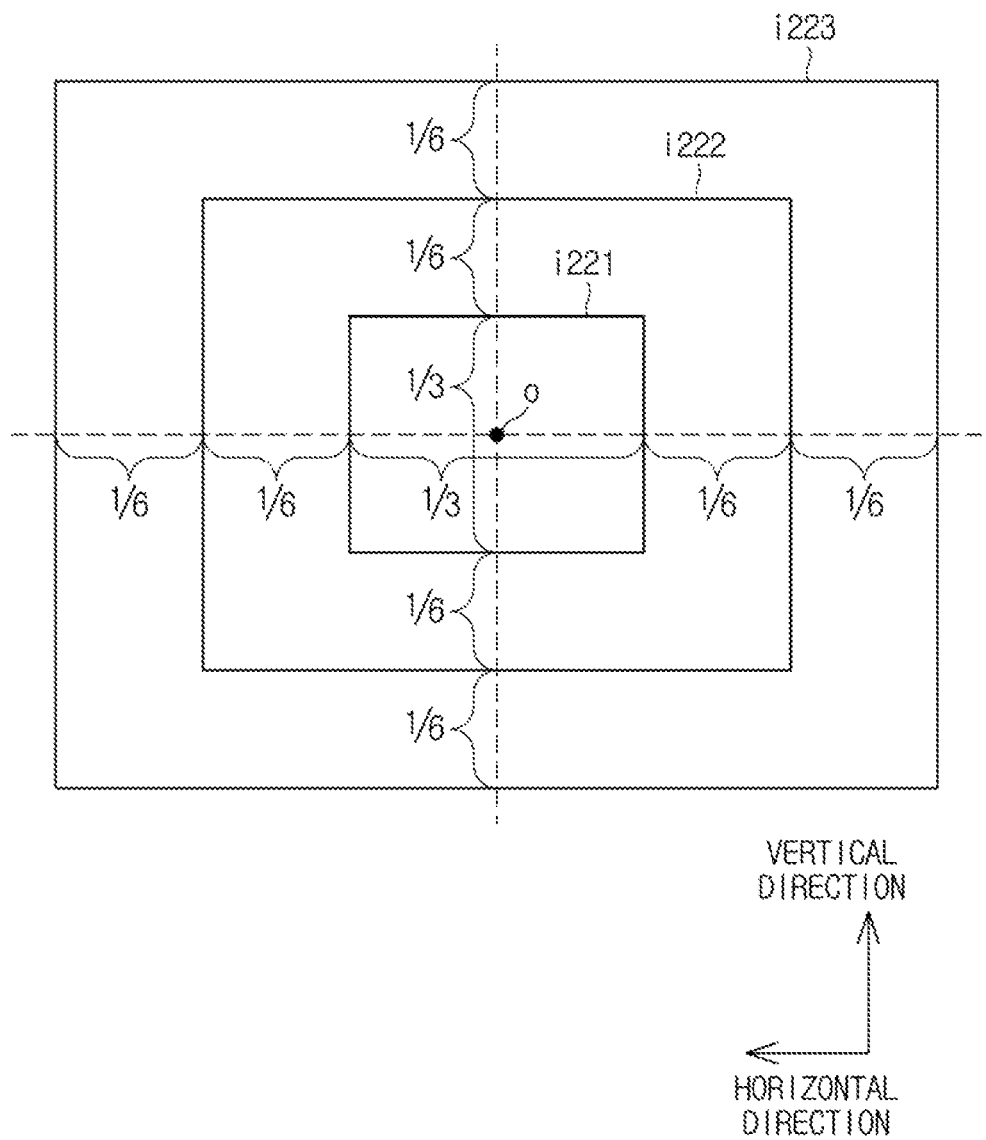
FIG. 17 shows another example of image division, according to an exemplary embodiment.

FIG. 17 shows another example of image division.

Referring to FIG. 17, the image divider 140 may divide the image i2 into three regions, e.g., a third region i221, a fourth region i222, and a fifth region i223. In this case, the image divider 140 may divide the image i2 such that the third region i221 is located within the fourth region i222, and the fourth region i222 is located within the fifth region i223. More specifically, the image i2 may be divided, such that the height and width of the third region i221 is a third of the height and width of the fifth region i213, the height and width of the fourth region i222 is two third of the height and width of the fifth region i223, and the third to fifth regions i221 to i223 may have the same center o.

Assuming that an image output from the image output unit 180 has ultrahigh resolution of 3840×2160, the size of a screen implemented by the image output unit 180 is about 55 inches, and a viewer is watching the image through the image output unit 180 two meters away, a viewing angle having the highest spatial resolution for the eyes of the viewer is about 0 to 20 degrees, and a viewing angle having the next highest spatial resolution is about 20 to 40 degrees. With the division shown in FIG. 17, the third region i221 is located within the viewing angle having the highest spatial resolution, and the fourth region i222 is located within the viewing angle having the next highest spatial resolution. The fifth region i223 is located in the viewing angle of 40 to 60 degrees having a less high spatial resolution to the eyes of the viewer.

Filtering may be performed differently depending on the spatial resolution for the eyes of the viewer by dividing the image i2 as shown in FIGS. 16 and 17 and differently performing filtering on the respective divided regions i211 and i212, or i221, i222, and i223.

For example, filtering may be performed by applying different filters to the respective divided regions i211 and i212, or i221, i222, and i223, e.g., applying first to third filters 171 to 173, or applying at least one of the first to third filters 171 to 173 only to a particular region, e.g., the first region i211 or the third region i221. More specifically, for example, a region having the high spatial resolution, e.g., the first region i211 or the third region i221 may be filtered to increase the sharpness of the region, while a region having the less high spatial resolution, e.g., the second region i212 or the fifth region i223 may be filtered to decrease the sharpness of the region. Furthermore, the second region i212 or the fifth region i223 may not be filtered. As such, filtering performed only on some of regions in the image may enhance the filtering speed while reducing unnecessary waste of resources.

Figure 18:
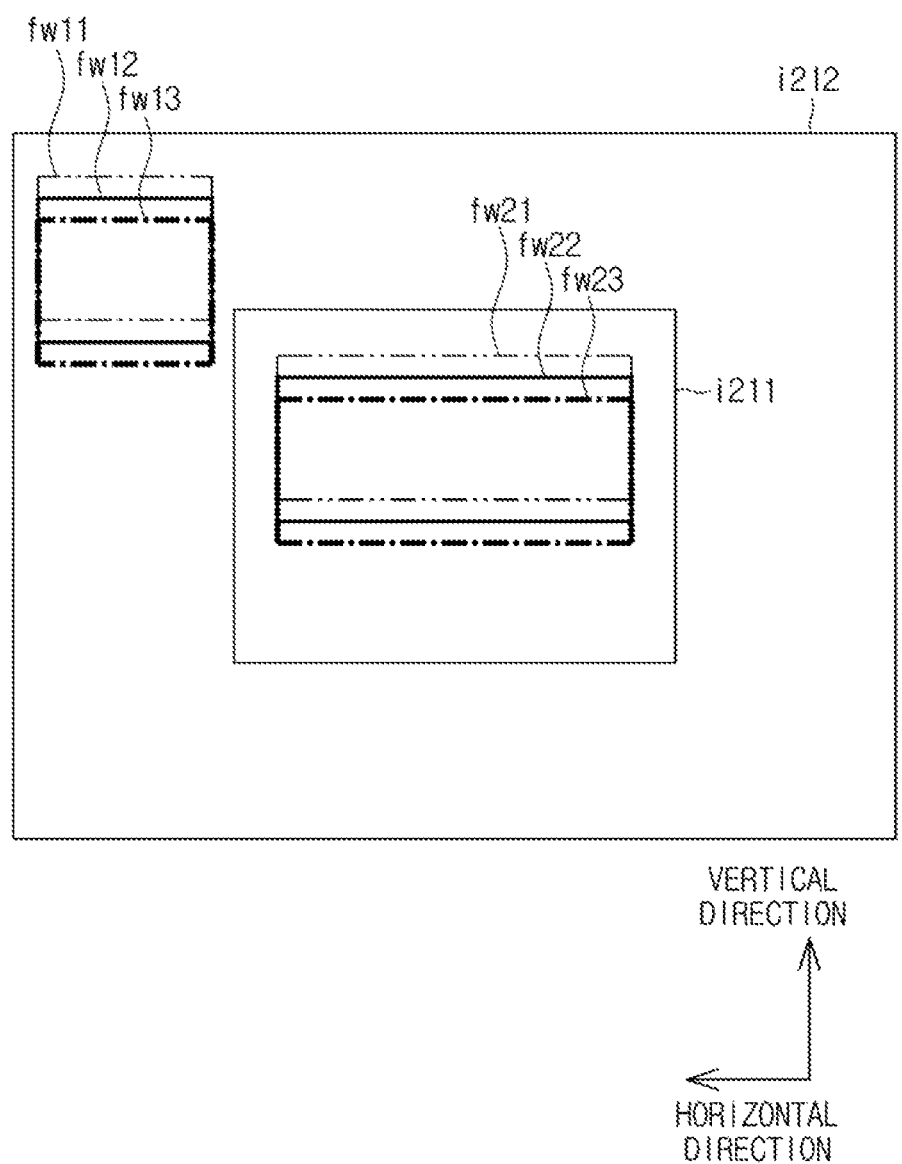
FIG. 18 shows an example where a filtering window is applied to each divided image, according to an exemplary embodiment.

FIG. 18 shows an example where a filtering window is applied to each divided image.

Referring to FIG. 18, filtering may be performed by applying filters that use different filtering windows to the respective regions i211 and i212. For example, the first region i211 may be filtered by sequentially applying asymmetric filtering windows fw21 to fw23, as shown in FIG. 14, and the second region i212 may be filtered by applying symmetric filtering windows fw11 to fw13. Alternatively, the respective divided regions i211 and i212 may be filtered by applying the same filtering window, e.g., the asymmetric filtering window fw2.

The focus level determiner 141 may determine a focus level for the entire image i2 input through the input unit 121, or respective focus levels for the plurality of regions i211 and i212, or i221, i222, and i223.

In an exemplary embodiment, the focus level determiner 141 may use the meta data m2 to determine a focus level for the entire image i2 or focus levels for the plurality of regions i211 and i212, or i221, i222, and i223. As described above, the meta data m2 may include information about an aperture value and/or a focal distance. Since the depth of field becomes long or short depending on the aperture value and/or focal distance, a focus level for the image i2 may be estimated to a certain extent, using the aperture value and/or focal distance. The focus level determiner 141 may use the aperture value and/or focal distance to determine a focus level for the entire image i2 or focus levels for the plurality of regions i211 and i212, or i221, i222, and i223.

In another exemplary embodiment, the focus level determiner 141 may determine a focus level for the entire image i2 or focus levels for the plurality of regions i211 and i212, or i221, i222, and i223, without use of the meta data m2.

First, the focus level determiner 141 may measure a focus level for the entire image (or all-frame-focus level (AFF)). The focus level determiner 141 may detect high and low frequency components in the image, and measure the AFF, which may be a focus level for the entire image, based on the result of detection of the high and low frequency components.

Next, the focus level determiner 141 may measure a center-frame-focus level (CFF), i.e., a focus level for some region among a plurality of regions i211 and i212, or i221, i222, and i223, e.g., the first region i211 or the third region i221, which is located in the center.

The focus level determiner 141 may further measure and determine a focus level of a region not located in the center, e.g., the second region i212, the fourth region i222, or the fifth region i223, as needed, the focus level being also called a Marginal-frame-focus level (MFF).

A difference (BFF) between the focus level for the entire image (AFF) and the focus level of the first region i211 or the third region i221, which is located in the center (CFF) may be calculated as in the following equation 1:

$$BFF=|AFF-CFF| \qquad (1)$$

Once the focus level is determined, the focus level determiner 141 may determine a focused state of the entire image based on the determined focus level AFF, CFF, MFF. The focused state refers herein to how the image is focused. For example, the focus level determiner 141 may determine whether the entire image is in out of focus state or a pan-focused state. The determination result may be sent to the enhanced filter applier 130, and the enhanced filter applier 130, specifically, the respective filter appliers 131 to 134 of the enhanced filter applier 130 may determine filters to be applied to the respective regions i211 and i212 or i221, i222, and i223, based on the received focused state AFF or CFF.

Several examples of how the focus level determiner 141 determines a focused state of an image, and of operation of the enhanced filter applier 130 based on the determination result will now be described.

First, for example, if the CFF is greater than a predetermined threshold and the MFF is less than a predetermined threshold, it means that the focus level of an object is high while the focus level of the background is low given that the object is generally located in the center. Accordingly, an input image as shown in FIG. 3 may be determined as being in an out-of-focus state in which an object ob1 is better focused rather than the background B1. The determination result is sent to the enhanced filter applier 130, which in turn performs filtering based on the received determination result.

In some exemplary embodiments, the focus level determiner 141 may determine a focused state by further referring to at least one of the aperture value and the focal distance in the meta data m2. For example, if it is determined based on the CFF and the MFF that the image is in out-of-focus state, whether the depth of field is short is determined based on at least one of the aperture value and the focal distance by referring to a database separately arranged or through additional calculation, or whether the image is in out-of-focus state may be determined by comparing the determination result based on the CFF and MFF with the determination result based on at least one of the aperture value and the focal distance. If the comparison of the determination result based on the CFF and MFF with the determination result based on at least one of the aperture value and the focal distance reveals that whether the image is in the out-of-focus state is not certain, the focus level determiner 141 may discard the determination result, send information about the determination result based on the CFF and MFF to the enhanced filter applier 130, or send information about the determination result based on the at least one of the aperture value and the focal distance to the enhanced filter applier 130.

If the focus level determiner 141 determines that the image is in the out-of-focus state, the enhanced filter applier 130 may perform filtering on the center region, e.g., the first region i211 and third region i221 by using at least one of a high frequency filter to enhance sharpness of the image, such as an unsharp filter, an edge enhancement filter, or a high pass filter, and an intermediate frequency filter, such as a bypass filter.

In the meantime, the enhanced filter applier 130 may perform filtering on a surrounding region, e.g., at least one of the second region i212, the fourth region i222, and the fifth region i223 by using at least one of an intermediate frequency filter, such as a bypass filter, and a low frequency filter, such as a low pass filter. To increase the difference in focus level between the center region i211 or i221 and the surrounding region i212, i222, or i223, i.e., to further enhance the out-of-focus effect, the enhanced filter applier 130 may perform filtering on the surrounding region i212, i222, i223 with the low frequency filter, or otherwise, may apply an intermediate frequency filter to the surrounding region i212, i222, i223.

In a second example, if the CFF is greater than a predetermined threshold and the MFF is also greater than a predetermined threshold, it means that a focus level for the entire image is high, and thus, the image may be determined as in the pan-focused state where the background B1 and the object ob1 are both in focus, as shown in FIG. 4. This determination result may also be sent to the enhanced filter applier 130 from the focus level determiner 141, and the enhanced filter applier 130 then performs filtering based on the received determination result.

Even in this case, the focus level determiner 141 may determine a focused state by further referring to at least one of the aperture value and the focal distance in the meta data m2. If at least one of the aperture value and the focal distance corresponds to pan focus, the focus level determiner 141 may determine that the image is in the pan-focused state.

If the focus level determiner 141 determines that the image is in the pan-focused state, the enhanced filter applier 130 may perform filtering by applying a high frequency filter to enhance sharpness of the image, such as an unsharp filter, an edge enhancement filter, or a high pass filter, an intermediate frequency filter, such as a bypass filter, or both the high frequency filter and the bypass filter, to all of the center region i211, i221 and the surrounding region i212, i222, i223.

In a third example, if the CFF is less than the predetermined threshold and the MFF is greater than the predetermined threshold, it is determined that the background b1 is better focused than the object ob1, i.e., that it is in an inverse out-of-focus state. Even in this case, the focus level determiner 141 may determine a focused state by further referring to at least one of the aperture value and the focal distance in the meta data m2.

In this case, the enhanced filter applier 130 may perform filtering by applying an intermediate frequency filter, such as a bypass filter to both the center region i211, i221 and the surrounding region i212, i222, i223, or by applying a high frequency filter or an intermediate frequency filter such as the bypass filter to the surrounding region i212, i222, i223 while applying a low frequency filter or the bypass filter to the center region i211, i221.

In a fourth example, if the CFF and the MFF are both less than a predetermined threshold, the focus level determiner 141 may determine that the entire image is out of focus, and the enhanced filter applier 130 may be configured to perform filtering by applying a low frequency filter or a bypass filter to the entire image, based on the information sent from the focus level determiner 141.

Turning back to FIG. 15, the display device 100a may further include an image quality measurer 150. The image quality measurer 150 may be implemented by a processor for the image processor 120, 120a, or by a separate processor.

The image quality measurer 150 may measure image quality between the image i2 before the image i2 is filtered and an enhanced image i3 resulting from filtering.

Specifically, the image quality measurer 150 may measure the image quality by calculating a Focus Dynamic Range (FDR) based on the CFF, the MFF, and the AFF.

The FDR may be given as in the following equation 2:

$$FDR = |MFF - CFF| \quad (2)$$

In the meantime, the AFF may be calculated by averaging the CFF and the MFF as in the following equation 3:

$$AFF = \frac{(MFF + CFF)}{2} \quad (3)$$

Accordingly, the FDR is given as in the following equation 4:

$$FDR = |MFF - CFF| = 2|AFF - CFF| \quad (4)$$

The image quality measurer 150 may calculate an FDR for the image i2 before filtering, FDR_before, and an FDR for the enhanced image i3, FDR_after, based on equations 2 to 4, and may calculate a difference FDR_Diff between them, i.e., a difference between FDR_before and FDR_after as in the following equation 5. Accordingly, the image quality measurer 150 may measure focus levels before and after a filtering process.

$$FDR_{Diff} = FDR_{Before} - FDR_{After} \quad (5)$$

The FDR_Diff, a difference between measurement values of image quality before and after filtering, may have a negative value or a positive value, depending on the situation.

Results of measuring focus levels before and after filtering, which are calculated by the image quality measurer 150, may be used for the designer to determine whether filtering is appropriate or whether operation of the display device 100a has errors. They may also be used in determining an extent to which image quality has been enhanced by the image processing. If the measurement result of the image quality measurer 150 reveals that the extent to which image quality has been enhanced is small, the iteration determiner 122 may determine to perform filtering relatively less iteratively according to a predetermined setting or a selection of the designer, thereby gaining an advantage in processing delay or relatively reducing power consumption of the display device 100a.

Other exemplary embodiments of the first to fourth filter appliers 131 to 134 of the enhanced filter applier 130 will now be described.

Figure 19:
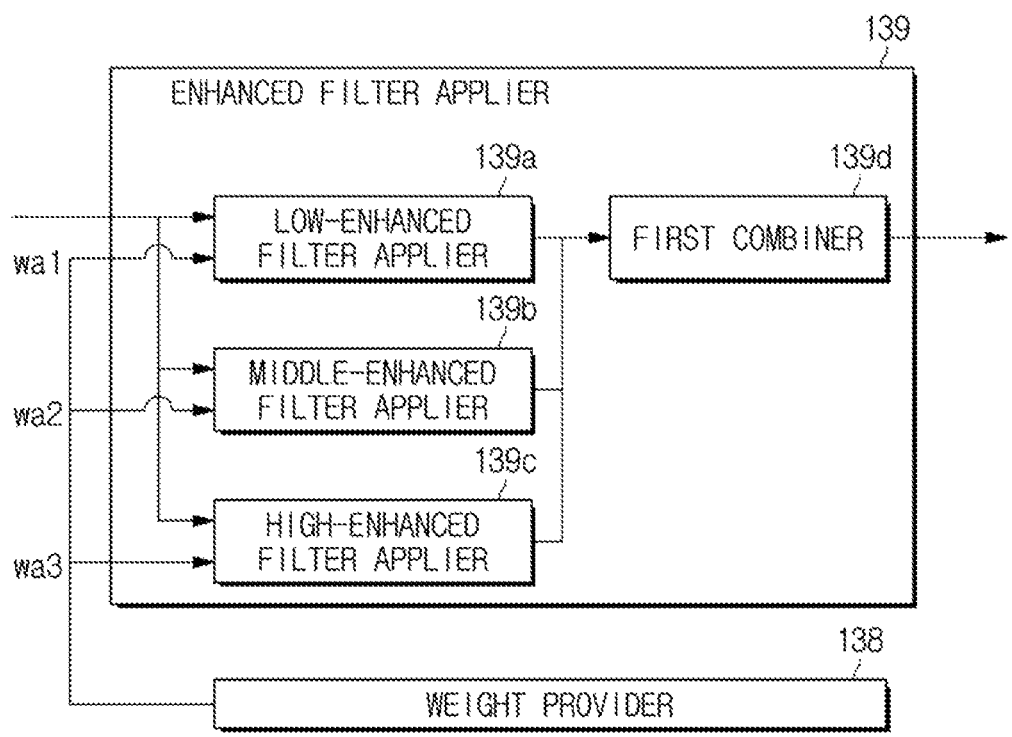
FIG. 19 is a diagram for explaining an enhanced filter applier, according to another exemplary embodiment.

FIG. 19 is a diagram for explaining an enhanced filter applier, according to another exemplary embodiment of the present disclosure.

Referring to FIG. 19, an enhanced filter applier 139 may include a low-enhanced filter applier 139a, a middle-enhanced filter applier 139b, a high-enhanced filter applier 139c, and a combiner 139d.

As described above in connection with FIGS. 15 to 17, the image divider 140 may divide an input image i2 into the plurality of regions i211 and i212, or i221, i222, and i223, and each of the plurality of regions i211 and i212, or i221, i222, and i223 divided from the image i2 may be sent to one of the low-enhanced, middle-enhanced, and high-enhanced filter appliers 139a, 139b, and 139c.

For example, a region to be filtered with a low frequency filter, e.g., a surrounding region i212, i222, i223 while the image is in the out-of-focus state may be sent to the low-enhanced filter applier 139a, and a region to be filtered with a high frequency filter, e.g., a center region i211, i221 while the image is in the out-of-focus state may be sent to the high-enhanced filter applier 139c. A region to be filtered with an intermediate frequency filter may be sent to the middle-enhanced filter applier 139b.

The low-enhanced filter applier 139a may perform filtering with a low frequency filter such as a low pass filter; the middle-enhanced filter applier 139b may perform filtering with an intermediate frequency filter such as a bypass filter; the high-enhanced filter applier 139c may perform filtering with a high frequency filter such as an unsharp filter. The low-, middle-, and high-enhanced filter appliers 139a, 139b, and 139c may each call a corresponding filter from the filter storage 170 and may perform filtering by applying the called filter to a received region i211 and i212, or i211, i222, and i223.

In an exemplary embodiment, the low-, middle-, and high-enhanced filter appliers 139a, 139b, and 139c may each include a plurality of filter appliers 131 to 134 as shown in FIGS. 7 and 9. Furthermore, while performing filtering, the low-, middle-, and high-enhanced filter appliers 139a, 139b, and 139c may each use the line memory 160.

In an exemplary embodiment, the low-, middle-, and high-enhanced filter appliers 139a, 139b, and 139c may receive certain weights wa1 to wa3 from a weight provider 138 arranged separately from the enhanced filter applier 139, and perform filtering using the weights wa1 to wa3. The weights provided from the weight provider 138 may include weights to control extents of filtering to be performed by filters. For example, if a large weight is provided to the high-enhanced filter applier 139c, the high-enhanced filter applier 139c may perform filtering such that a certain region in the image has relatively high sharpness. On the contrary, if a small weight is provided to the high-enhanced filter applier 139c, the high-enhanced filter applier 139c may perform filtering such that a certain region in the image has relatively low sharpness.

The low-, middle-, and high-enhanced filter appliers 139a, 139b, and 139c may filter an image by applying the weights wa1 to wa3 to the respective filters. In this case, since the low-, middle-, and high-enhanced filter appliers 139a, 139b, and 139c are configured to filter the respective particular regions i211, i212, or i221, i222, i223, the respective regions i211, i212, or i221, i222, i223 may have relatively high sharpness or more blur effects, or may have relatively low sharpness or less blur effects, depending on the weights.

In an exemplary embodiment, a relatively small weight may be provided to the low-enhanced filter applier 139a, a relatively large weight may be provided to the high-enhanced filter applier 139c, and a medium weight may be provided to the middle-enhanced filter applier 139b. Accordingly, an image in which a region in focus is corrected to be better focused while a region out of focus is corrected to be more out of focus may be obtained.

The certain weights wa1 to wa3 provided from the weight provider 138 to the low-, middle-, and high-enhanced filter appliers 139a, 139b, and 139c may be arbitrarily selected by the designer or by the user of the display device 100a.

A first combiner 139d may restore an image before the image was divided, by combining the plurality of regions i211 and i212, or i221, i222, and i223 filtered by the respective low-, middle-, and high-enhanced filter appliers 139a, 139b, and 139c.

Several exemplary embodiments of a method for filtering pixels located around the edges of a filtering window in the case that the filtering window is used will now be described in connection with FIGS. 20 to 29.

Figure 20:
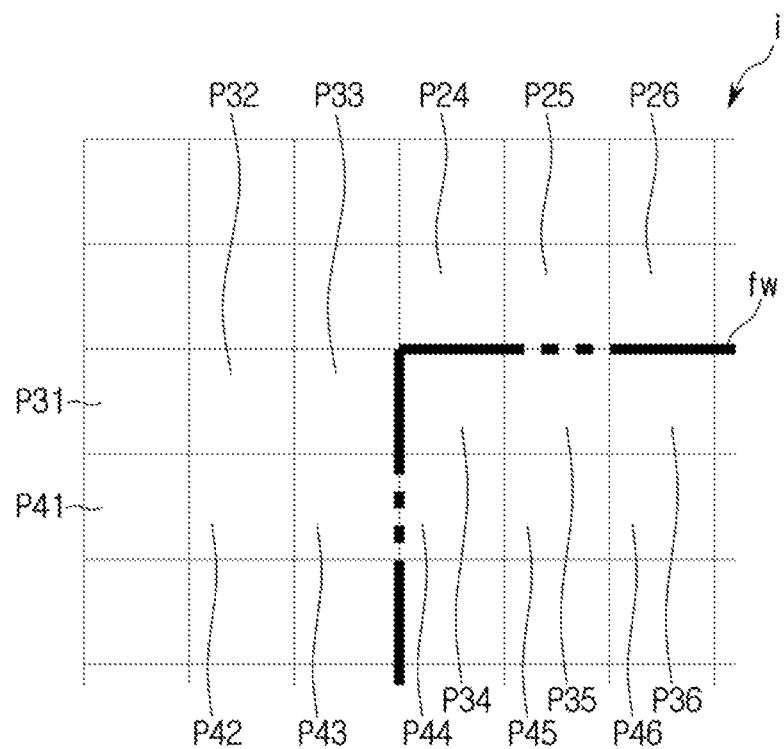
FIG. 20 shows surroundings of edges of a filtering window, according to an exemplary embodiment.

FIG. 20 shows surroundings of the edges of a filtering window.

Referring to FIG. 20, in the case of applying a filtering window fw, some pixels P34 to P36, P44 to P46, etc., are located within the filtering window f2 while some other pixels P24 to P26, P31 to P33, P41 to P43 are placed outside and around the edges of the filtering window fw. As described above, the image processor 120 may acquire an enhanced image i3 by performing filtering multiple times. In this case, the image i3 acquired after filtering may vary depending on which value is used as data of a pixel located outside but adjacent to the edge of the filtering window.

Figure 21:
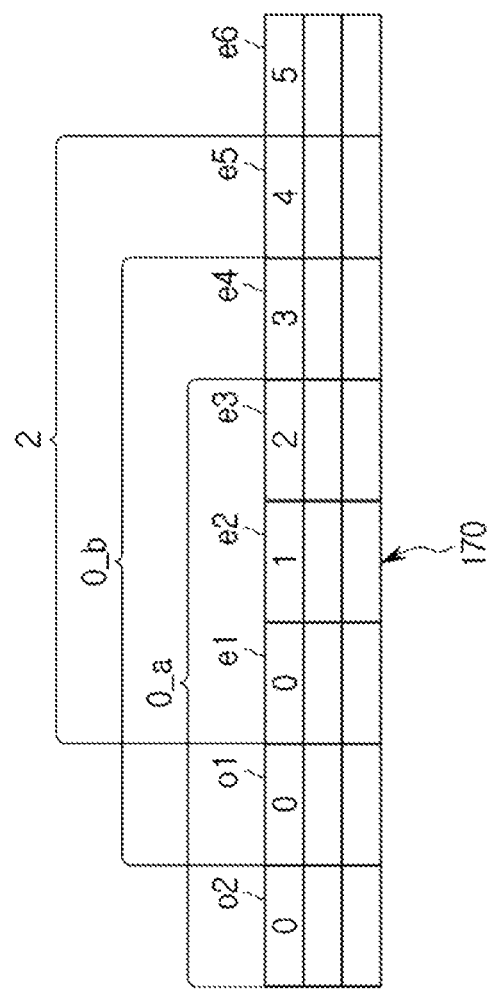
Figure 22:
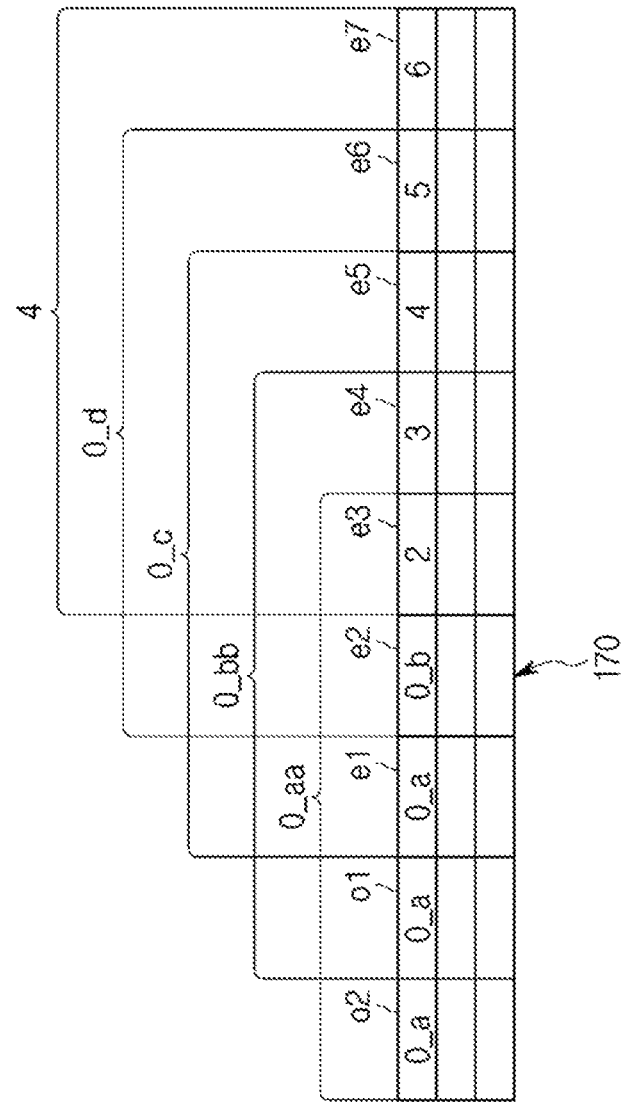
Figure 23:
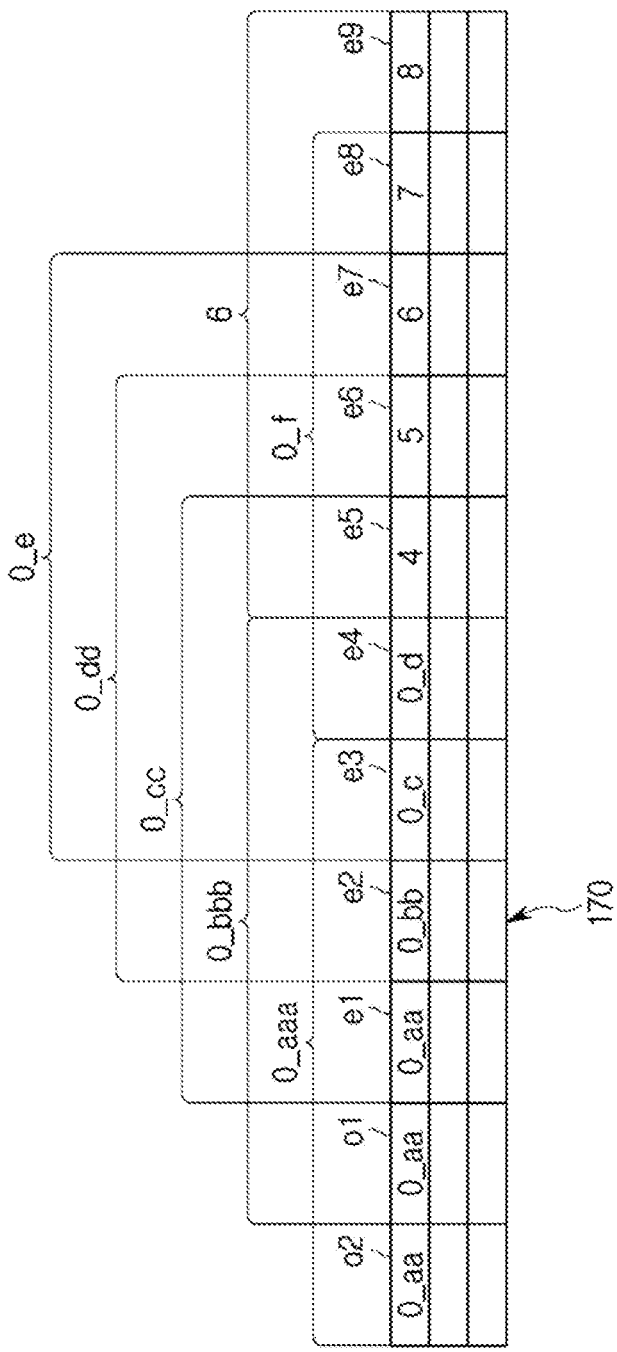
Figure 24:
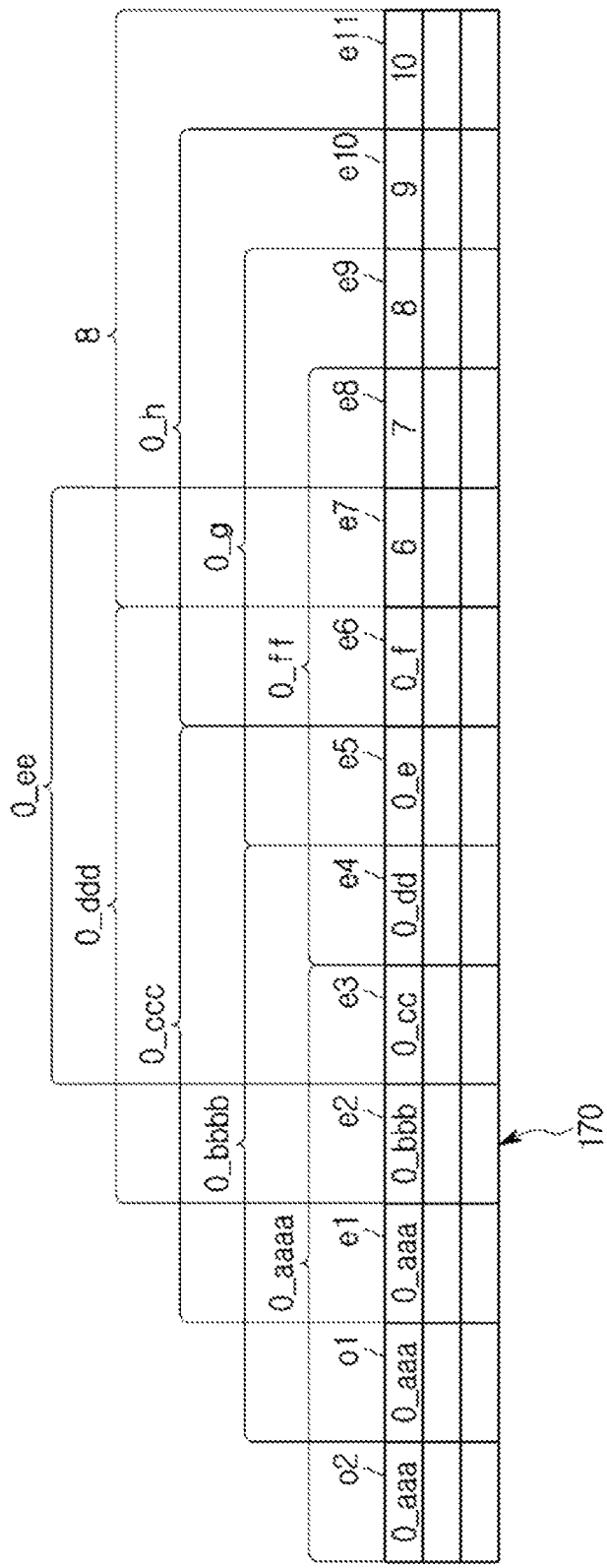
Figure 25:
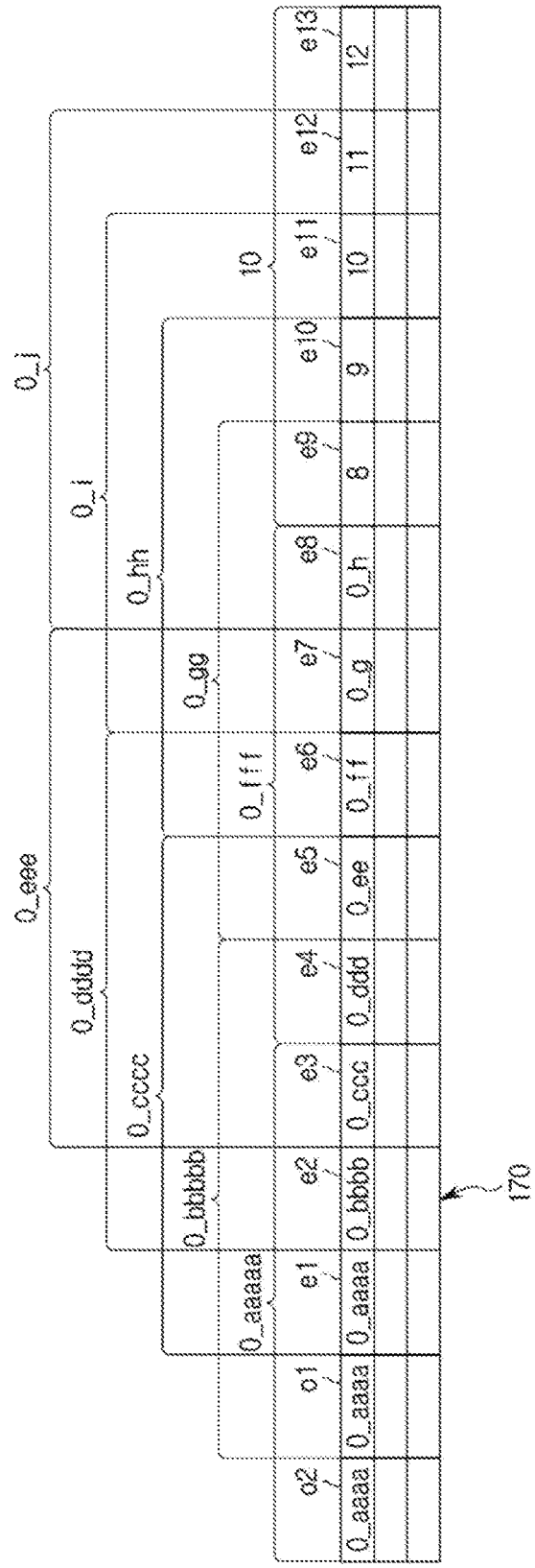

FIGS. 21 to 26 show pixel values obtained by repeatedly using pixel values of pixels outside and adjacent to the edges of a filtering window. FIG. 21 shows a result of first filtering, FIG. 22 shows a result of iterative filtering for the second time, FIG. 23 shows a result of iterative filtering for the third time, FIG. 24 shows a result of iterative filtering for the fourth time, FIG. 25 shows a result of iterative filtering for the fifth time, and FIG. 26 shows filtered data which is finally obtained.

In FIGS. 21 to 26, shadow areas refer to the inside of a filtering window while non-shadow areas refer to the outside of the filtering window. Braces above in FIGS. 21 to 26 represent pixels used in particular filtering, and the numbers on the braces represent filtering result values obtained from the filtering. In this case, assume that filtering is performed in the horizontal direction. In the meantime, filtering result values that may be affected by repetitive use of pixel values of pixels outside and adjacent to the edges of the filtering window may be represented like 0_a, 0_b, or the like, and filtering result values that may not be affected each refer to an average value of data of pixels embraced by the brace. The filtering result values, however, are not limited thereto. Although exemplary embodiments that use data of 5 pixels are shown in FIGS. 21 to 26 for convenience of explanation, the number of pixels to be used is not limited thereto and may be arbitrarily determined by the designer.

In the case of filtering pixels within a filtering window as shown in FIG. 21, a second pixel e2 and a third pixel e3 exist to the right of a first pixel e1 located around the edge of the filtering window, but no pixel exists to the left of the first pixel e1. Accordingly, in order to filter the first pixel e1, virtual pixels 01, 02 to the left of the first pixel e1 may be assumed, and the virtual pixels 01, 02 may be set to have a duplicate value of the value of the first pixel e1.

In this case, while filtering is performed, the value of the first pixel e1 may be affected by data corresponding to the virtual pixels 01, 02, and accordingly, transformed to 0_a. The value of the second pixel e2 may also be affected by a value corresponding to the virtual pixel 02, and accordingly, transformed to 0_b. Filtered data of the third pixel e3 and pixels that are to the right of the third pixel e3 are not affected by the virtual pixels 01, 02. Accordingly, they have a proper value, e.g., a value of 2.

Referring to FIG. 22, in the case of filtering the pixels within the filtering window for the second time, since the values of the first pixel e1 and the second pixel e2 were affected by the data of the virtual pixel 01, 02, the first to fourth pixels e1 to e4, which use at least one of the virtual pixels 01, 02, the first pixel e1, and the second pixel e2, may be directly or indirectly affected by the virtual pixels 01, 02 as well. Accordingly, the first to fourth pixels e1 to e4 have values 0_aa, 0_bb, 0_c, and 0_d, respectively. The fifth to seventh pixels e5 to e7, which are not affected by the virtual pixels 01, 02, the first pixel e1, or the second pixel e2, have proper values.

Referring to FIG. 23, in the case of performing iterative filtering, values of the first to sixth pixels e1 to e6 are directly or indirectly affected by the virtual pixels 01, 02 in the same way as described above, and a seventh pixel e7 and pixels e8, e9 located to the right of the seventh pixel e7 are not affected by the virtual pixels 01, 02 and transformed properly.

Referring to FIGS. 24 and 25, in the case that filtering is performed over and over again, the seventh to tenth pixels e7 to e10 are also directly or indirectly affected by the virtual pixels 01, 02. In this way, as the number of iteration increases, the number of pixels, having unintended values by being affected by the virtual pixels 01, 02, increases as well.

Finally, referring to FIG. 26, pixels within the filtering window have unintended data, thereby lowering accuracy in restoring the image.

Figure 27:
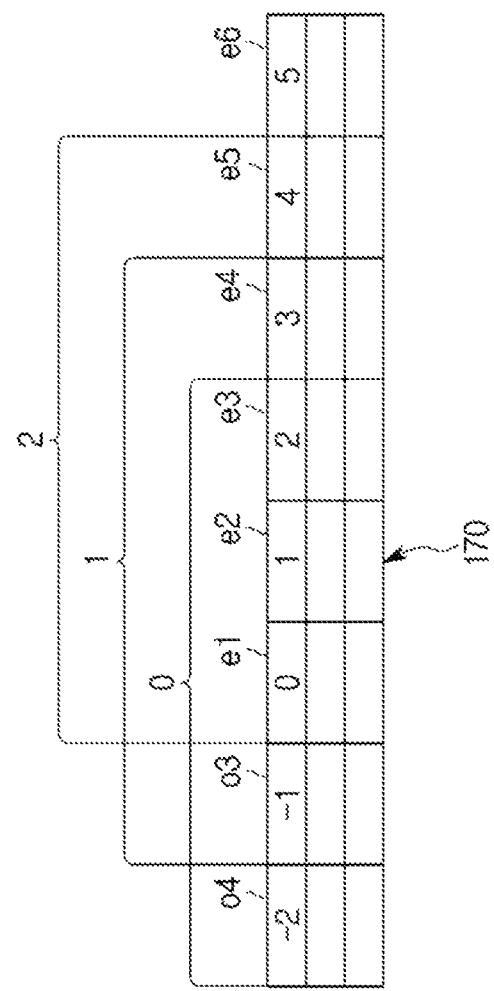
Figure 28:
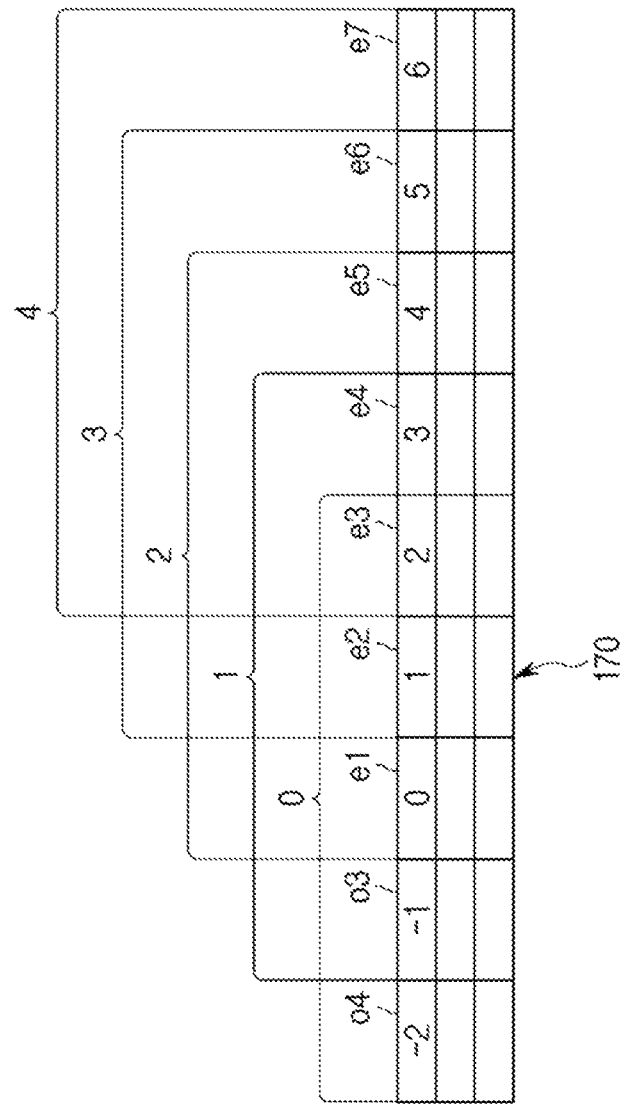
Figure 29:
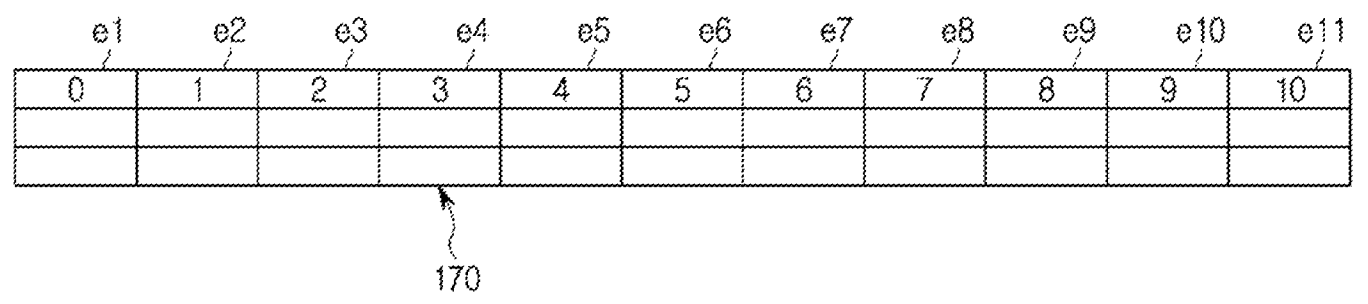

FIGS. 27 to 29 are diagrams for explaining pixel values of pixels obtained by using actual values outside the edges of a filtering window.

FIG. 27 shows a result of filtering for the first time, FIG. 28 shows a result of filtering for the second time, and FIG. 29 shows a result of filtering for the last time.

Shadow regions, braces, numbers on the braces, and filtering result values of FIGS. 27 to 29 have the same meaning as described in connection with FIGS. 21 to 26.

In the case of filtering pixels within a filtering window as shown in FIG. 27, a second pixel e2 and a third pixel e3 exist to the right of a first pixel e1 located around the edge of the filtering window, but no pixel may exist to the left of the first pixel e1. In this case, on the contrary to what is described above, actual data may be used in filtering. In other words, actual data that does not exist within the filtering window but actually exists in the image is used in filtering.

In this case, not virtual pixels but actual data is used in performing filtering, and thus the value of the first pixel e1 is not affected by virtual data. Likewise, the second pixel e2 and the third pixel e3 are not affected by the virtual data. Accordingly, proper data for the first to third pixels e1 to e3 may be obtained from the filtering.

Even in the case that filtering is repeated as shown in FIG. 28, the respective pixels e1 to e7 are not affected by virtual data, and thus proper data for the pixels e1 to e7 is obtained.

Finally, referring to FIG. 29, pixels within the filtering window have proper data, thereby preventing degradation of the accuracy in restoring the image.

As described above, in case of performing filtering by using a symmetric filtering window fw1 while using data inside and adjacent to both left and right edges of the symmetric filtering window fw1 instead of using actual data outside and adjacent to both left and right edges of the symmetric filtering window fw1, if the filtering is iteratively performed, the respective pixels inside the symmetric filtering window fw1 may be affected by the data inside and adjacent to both left and right edges of the symmetric filtering window fw1, and a filtered image finally obtained may be different from the original image. For example, in case of using a 11×11 symmetric filtering window, two pixels on either edge inside the symmetric filtering window fw1, i.e., four pixels, are affected in every iteration. Accordingly, if filtering is performed five times, 20 pixels may be affected, and in the end, all the pixels within the 11×11 symmetric filtering window are affected.

However, in the case of using an asymmetric filtering window fw2, e.g., a 71×11 window, even if duplicate data inside and adjacent to both left and right edges of the asymmetric filtering window fw2 is used instead of using actual data that exists outside and adjacent to both left and right edges of the asymmetric filtering window fw2, not all the pixels that exist within the asymmetric filtering window fw2 are affected by the data inside and adjacent to both left and right edges of the asymmetric filtering window fw2. Furthermore, if the data of pixels outside and adjacent to both left and right edges of the asymmetric filtering window fw2 is directly used, data of the respective pixels may be the same or almost the same as the original data, and little different from the original data. Accordingly, in the case of using the asymmetric filtering window fw2 while directly using data that exists outside and adjacent to both edges of the asymmetric filtering window fw2, an image, which is substantially the same as the original image i1, may be obtained.

An exemplary embodiment of an encoder and decoder will now be described in connection with FIGS. 30 and 31.

Figure 30:
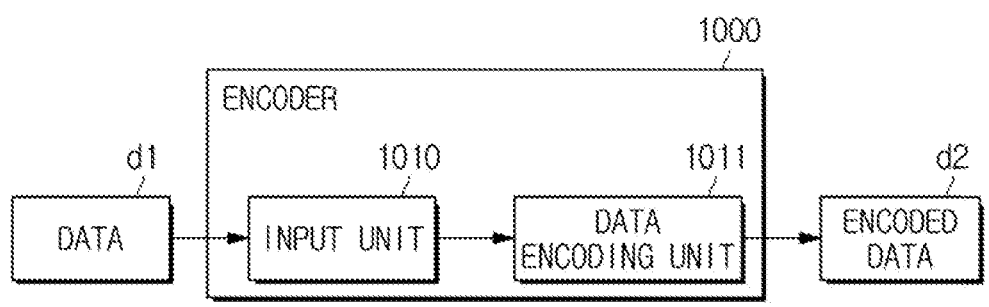
FIG. 30 is a block diagram of an encoder, according to an exemplary embodiment.
Figure 31:
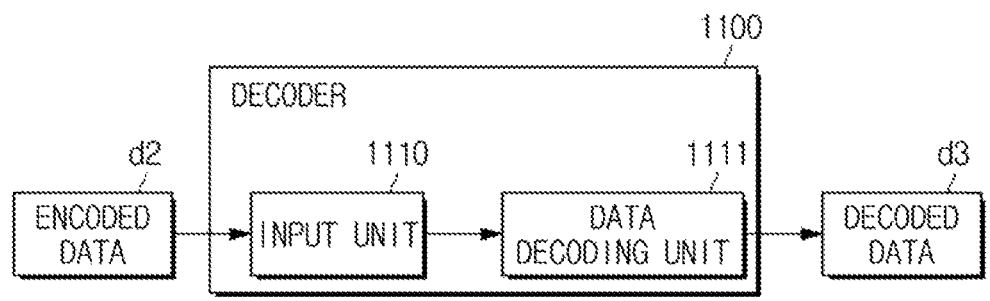
FIG. 31 is a block diagram of a decoder, according to an exemplary embodiment.

FIG. 30 is a block diagram of an encoder, according to an exemplary embodiment of the present disclosure, and FIG. 31 is a block diagram of a decoder, according to an exemplary embodiment of the present disclosure.

Referring to FIG. 30, an encoder 1000 may include an input unit 1010 and a data encoding unit 1011.

The input unit 1010 receives data d1, which is a target to be encoded, and forwards the data d1 to the data encoding unit 1011. The input unit 1010 may include various types of data readers capable of reading in certain data, and a communication module for communicating with an external device that provides data.

The data encoding unit 1011 may encode data in various methods, such as compression or filtering. The data encoding unit 1011 may encode data in an encoding method that corresponds to a data decoding method of a data decoding unit 1111 of a decoder 1100. In an exemplary embodiment, the data encoding unit 1011 may add a blur effect to input data, e.g., image data, by applying a low frequency filter such as a low pass filter to the image data. For example, the data encoding unit 1011 may add the blur effect to the image data by using an asymmetric filter that uses an asymmetric filtering window as described above. With the asymmetric filtering window, the data encoding unit 1011 may perform filtering by using actual data that exists outside the both edges of the asymmetric filtering window fw2. Operation of the aforementioned image processor 120 may be applied to the data encoding unit 1011 equally or with modification that may be easily considered by the designer. The operation was already described above, so the description will be omitted herein.

According to the aforementioned method, the encoder 1000 may obtain encoded data d2. The obtained encoded data d2 may be sent to a physical storage device, or a decoder 1110 via a wired or wireless network.

Referring to FIG. 31, the decoder 1100 may include an input unit 1110 and a data decoding unit 1111.

The input unit 1110 may receive the encoded data d2 from the encoder 1000, and forward the received encoded data d2 to the data decoding unit 1111. The input unit 1010 may include various types of data readers capable of reading in encoded data d2, and a communication module for communicating with an external encoder 1000.

The data decoding unit 1111 may obtain decoded data d3, which is the same or almost the same as the original data d1, by decoding the encoded data d2. The data decoding unit 1111 may decode the encoded data d2 in a decoding method that corresponds to a data encoding method of the data encoding unit 1011. In an exemplary embodiment, if the encoded data d2 is image data, to which a blur effect was added by applying a low frequency filter thereto, the data decoding unit 1111 may obtain the original image data before the blur effect was added thereto, by applying a high frequency filter, such as unsharp filter. The data decoding unit 1111 may be configured to obtain decoded data d3, which is the same as or similar to the original data d1, by enhancing the image data with an asymmetric filter that uses an asymmetric filtering window, as described above. With the asymmetric filtering window, the data decoding unit 1111 may perform filtering by using actual data that exists outside both edges of the asymmetric filtering window fw2, in the same way as described above. Operation of the aforementioned image processor 120 may be applied to the data decoding unit 1111 equally or with modification that may be easily considered by the designer. The operation was already described above, so the description will be omitted herein.

According to the operation of the data decoding unit 1111, the decoded data d4 may be obtained.

Figure 32:
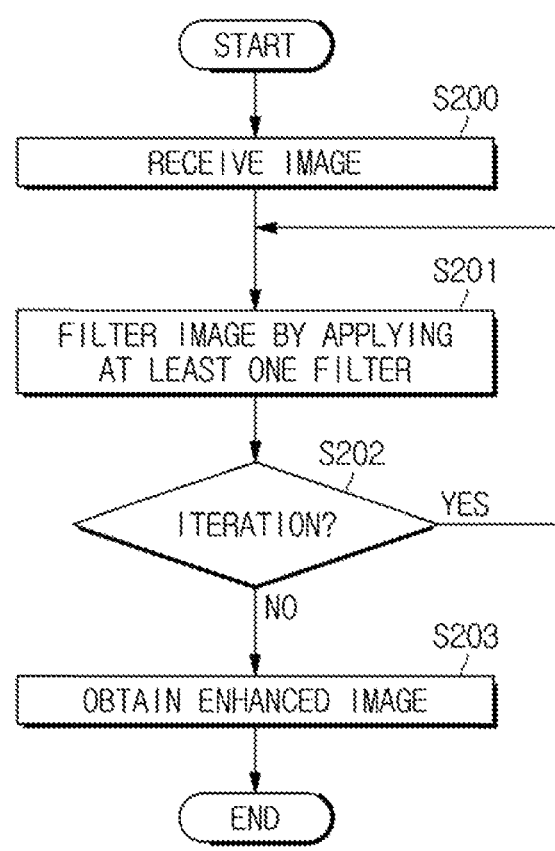
FIG. 32 is a flowchart illustrating an image processing method, according to an exemplary embodiment.
Figure 33:
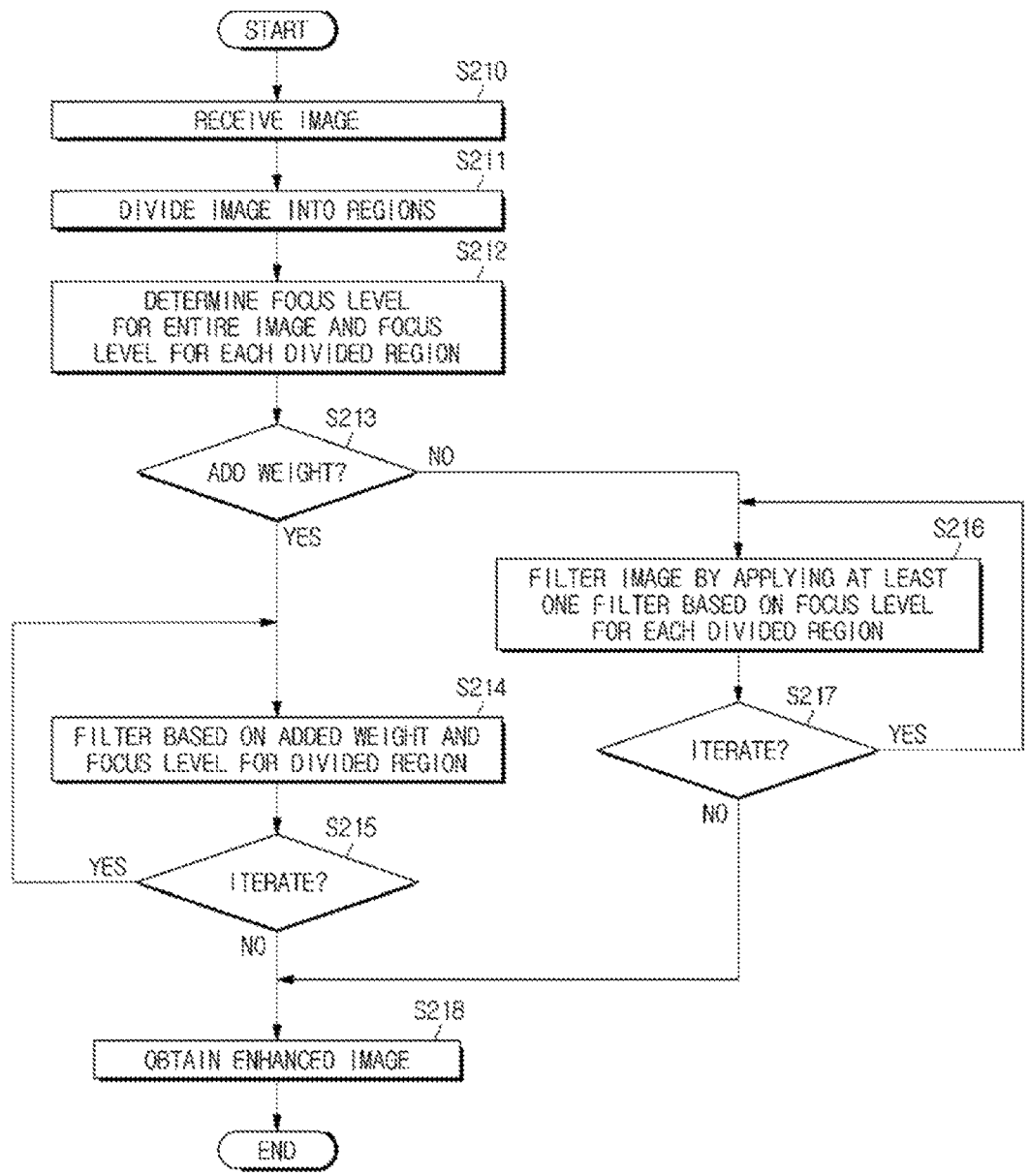
FIG. 33 is a flowchart illustrating an image processing method, according to another exemplary embodiment.

Referring to FIGS. 32 and 33, an image processing method will now be described according to various exemplary embodiments of the present disclosure.

FIG. 32 is a flowchart illustrating an image processing method, according to an exemplary embodiment of the present disclosure.

In the exemplary embodiment of the image processing method, a display device to perform image processing receives an image, in step s200.

The display device may filter the image by applying at least one filter to the image, in step s201. In this regard, the filter used by the display device may include at least one of high, medium, and low frequency filters, and the display device may select one of the stored high, medium, and low frequency filters as needed, and perform filtering using the selected filter. Furthermore, the display device may perform filtering using at least one of filters that use symmetric windows and asymmetric windows. With the use of the symmetric or asymmetric window, the display device may perform filtering by using actual data of pixels located outside and adjacent to both left and right edges of the filtering window, in order to calculate values of pixels adjacent to the edges of the filtering window. This was described above, so the detailed description will be omitted herein.

Once the image filtering is completed, whether to iterate the image filtering may be determined, in step s202. Whether to iterate the image filtering may be determined by using a minimum mean square error (MMSE), comparison with a predetermined threshold, a cost function, or least square estimation.

If iterative filtering is determined, the display device may iteratively filter the image by applying at least one filter to the image, in step s201. Otherwise, if it is determined to finish iterative filtering, image processing is finished and the display device obtains an enhanced image, in step s203. The obtained image may be output through the image output unit of the display device.

FIG. 33 is a flowchart illustrating an image processing method, according to another exemplary embodiment of the present disclosure.

In the exemplary embodiment of the image processing method, a display device to perform image processing receives an image, in step s210.

The display device may divide the image into a plurality of regions, in step s211. In this regard, the display device may divide the image into two, three, four or more regions according to a setting determined by the designer in advance or according to the user's selection. In this case, some region(s) may be located in the center of the image or around the center region, as shown in FIGS. 16 and 17.

The display device may determine a focus level for the entire image, and focus levels for the respective divided regions, for example, a focus level of the center region and a focus level of a surrounding region, in step s212. Once the focus levels for the center and surrounding regions are determined, a focused state of the image may be determined based on the focus levels. The focused state of the image may be determined based on not only the focus levels of the center and surrounding regions but also the meta data, such as a focal distance or an aperture value.

After the focus levels for the entire image and the divided regions are determined, the display device may determine whether to apply weights to the respective regions and the weights to be applied to the respective regions, in step s213. In some exemplary embodiments, determining whether to apply weights to the respective regions and the weights to be applied to the respective regions may be performed simultaneously with determination of the focus levels for the entire image and the divided regions, or before determination of the focus levels for the entire image and the divided regions.

If weights are to be applied to the respective regions, the display device may perform filtering based on the weights to be applied and the focus levels for the respective divided regions, in step s214. In this case, for example, if the image is in the out-of-focus state, filtering may be performed by applying a high frequency filter or an intermediate frequency filter with a high weight to the center region of the image while applying a low frequency filter with a low weight to the surrounding region, and if the image is in the pan-focused state, filtering may be performed by applying a high frequency filter or an intermediate frequency filter to both the center and surrounding regions while applying the same or similar weights for the regions.

Once the image filtering is completed, whether to iterate the image filtering may be determined, in step s215. Whether to iterate the image filtering may be determined by using a minimum mean square error (MMSE), comparison with a predetermined threshold, a cost function, or least square estimation.

If it is determined to perform iterative filtering, the display device may iteratively filter the image by applying at least one filter to the image based on the weights to be applied and the focus levels for the respective regions, in step s214. Otherwise, if it is determined to finish iterative filtering, image processing is finished and the display device obtains an enhanced image, in step s218. The obtained image may be output through the image output unit of the display device.

In a case that no weight is to be applied to the respective regions, the display device may perform filtering by applying at least one filter based on the focus levels for the respective divided regions, in step s216. In this case, for example, if the image is in the out-of-focus state, filtering may be performed by applying a high frequency filter or an intermediate frequency filter to the center region of the image while applying a low frequency filter to the surrounding region, and if the image is in the pan-focused state, filtering may be performed by applying a high frequency filter or an intermediate frequency filter to both the center and surrounding regions.

Once the image filtering is completed, whether to iterate the image filtering may be determined, in step s217. In the same way as described above, whether to iterate the image filtering may be determined by using a minimum mean square error (MMSE), comparison with a predetermined threshold, a cost function, or least square estimation.

If it is determined to perform iterative filtering, the display device may iteratively filter the image by applying at least one filter to the image based on the focus levels for the respective regions, in step s216. Otherwise, if it is determined to finish iterative filtering, image processing is finished and the display device obtains an enhanced image, in step s218. The obtained image may be output through the image output unit of the display device.

The image processing method may be applied to a decoding method of a decoder equally, or with partial modification.

According to exemplary embodiments of the image processing apparatus and method, and decoding apparatus, image quality of an image may be processed by reflecting intention of a producer who produces image data.

According to the exemplary embodiments, in performing loop-based image processing, image processing speed may be increased by enhancing image quality processing performance and thus performing image processing as much as possible within a limited loop.

According to the exemplary embodiments, since the use of resources required in image processing may be held back to the minimum, it is easier to manufacture the image processing apparatus or display device, and expanses of production of the image processing apparatus or display device may also be saved.

According to the exemplary embodiments, in performing inverse-transform image processing, an image-quality processing model may be properly acquired, and a high-resolution image may be quickly and accurately restored with relatively less resources.

Several exemplary embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. An image processing apparatus comprising:
a receiver configured to receive an image; and
an image processor configured to divide the image into a plurality of regions, and to generate an enhanced image by iteratively applying at least one filter to each of the plurality of regions in the image,
wherein the at least one filter comprises an asymmetric filter that uses an asymmetric filtering window having a first height and a first width different from the first height,
wherein the image processor applies a different kind of filter according to a focus state of the image, and
wherein the image processor is further configured to determine a plurality of focus levels, each of the plurality of focus levels respectively corresponding to one of the plurality of regions in the image.

2. The image processing apparatus of claim 1, wherein the at least one filter comprises at least one among a high frequency filter, an intermediate frequency filter, and a low frequency filter.

3. The image processing apparatus of claim 1, wherein the plurality of regions comprises a center region and a surrounding region.

4. The image processing apparatus of claim 3, wherein the image processor is further configured to determine a focused state of the image based on a center region focus level corresponding to the center region and a surrounding region focus level corresponding to the surrounding region.

5. The image processing apparatus of claim 4, wherein the image processor is further configured to apply at least one among a high frequency filter and an intermediate frequency filter to the center region, and a low frequency filter to the surrounding region, based on the image being in an out-of-focus state.

6. The image processing apparatus of claim 4, wherein the image processor is further configured to apply a same filter to the center region and the surrounding region, based on the image being in a pan-focused state.

7. The image processing apparatus of claim 1, wherein the image processor is further configured to determine a plurality of respective weights, each of the plurality of respective weights respectively corresponding to one of the plurality of regions, issue the plurality of respective weights to the at least one filter, and apply the at least one filter, to which the weights are issued, to each of the plurality of regions in the image.

8. The image processing apparatus of claim 1, wherein the at least one filter further comprises a symmetric filter that uses a symmetric filtering window having a second height and a second width equal to the second height.

9. The image processing apparatus of claim 8, wherein the image processor comprises a first filter applier configured to sequentially perform filtering and a second filter applier configured to sequentially perform filtering.

10. The image processing apparatus of claim 9, wherein the first filter applier and the second filter applier are configured to perform filtering with at least one asymmetric filter and a symmetric filter.

11. The image processing apparatus of claim 1, wherein the image processor is further configured to perform filtering by applying the asymmetric filter to $k^{th}$ to $n^{th}$ rows in the image, and perform filtering again by applying the asymmetric filter to $k+1^{th}$ to $n+1^{th}$ rows in the image, where k and n are natural numbers and k is smaller than n.

12. The image processing apparatus of claim 1, wherein the image processor is further configured to filter a first pixel located in a region of the plurality of regions in the image, to which the asymmetric filtering window is applied.

13. The image processing apparatus of claim 12, wherein the image processor is further configured to filter the first pixel by using data of at least one pixel located in the region and located adjacent to the first pixel.

14. The image processing apparatus of claim 12, wherein the image processor is further configured to filter the first pixel by using data of at least one pixel located in the region and located adjacent to the first pixel, and data of at least one pixel located outside the region and located adjacent to the first pixel.

15. The image processing apparatus of claim 14, wherein the data of at least one pixel located outside the region and located adjacent to the first pixel comprises actual data of the at least one pixel located outside the region and located adjacent to the first pixel.

16. The image processing apparatus of claim 1, wherein the first width is greater than the first height.

17. An image processing method comprising:
receiving an image; and
generating an enhanced image by iteratively applying at least one filter to the image,
wherein the at least one filter comprises an asymmetric filter that uses an asymmetric filtering window having a first height and a first width different from the first height,
wherein a different kind of filter is applied to the image according to a focus state of the image, and
wherein a plurality of focus levels is determined, each of the plurality of focus levels respectively corresponding to one of a plurality of regions in the image.

18. An image processing method comprising:
receiving an image; and
generating an enhanced image by iteratively applying at least one filter to a first pixel located in a region in the image, the at least one filter using an asymmetric filtering window,
wherein a different kind of filter is applied to the image according to a focus state of the image, and
wherein a plurality of focus levels is determined, each of the plurality of focus levels respectively corresponding to one of a plurality of regions in the image.

* * * * *